United States Patent
Bleuzen et al.

(10) Patent No.: US 8,672,635 B2
(45) Date of Patent: Mar. 18, 2014

(54) OPTIMIZED AERODYNAMIC PROFILE FOR A TURBINE BLADE, IN PARTICULAR FOR A ROTARY WHEEL OF THE FIRST STAGE OF A TURBINE

(75) Inventors: Jean Bleuzen, Guignes (FR); Renaud Martet, Palaiseau (FR); Pascal Routier, Le Mee sur Seine (FR); Renaud Royan, Sucy en Brie (FR)

(73) Assignee: Snecma, Paris (FR)

( * ) Notice: Subject to any disclaimer, the term of this patent is extended or adjusted under 35 U.S.C. 154(b) by 333 days.

(21) Appl. No.: 13/171,734

(22) Filed: Jun. 29, 2011

(65) Prior Publication Data

US 2012/0051931 A1    Mar. 1, 2012

Related U.S. Application Data

(60) Provisional application No. 61/367,587, filed on Jul. 26, 2010.

(51) Int. Cl.
*F01D 5/14*    (2006.01)

(52) U.S. Cl.
USPC ..................................... 416/223 A

(58) Field of Classification Search
None
See application file for complete search history.

(56) References Cited

U.S. PATENT DOCUMENTS

2007/0183897 A1    8/2007  Sadler et al.

FOREIGN PATENT DOCUMENTS

EP    1 584 787 A2    10/2005

OTHER PUBLICATIONS

U.S. Appl. No. 13/171,653, filed Jun. 29, 2011, Gruimbard, et al.
U.S. Appl. No. 13/171,561, filed Jun. 29, 2011, Girard, et al.
U.S. Appl. No. 13/171,586, filed Jun. 29, 2011, Girard, et al.
U.S. Appl. No. 13/170,239, filed Jun. 28, 2011, Bleuzen, et al.
U.S. Appl. No. 13/171,758, filed Jun. 29, 2011, Girard, et al.

*Primary Examiner* — Richard Edgar
(74) *Attorney, Agent, or Firm* — Oblon, Spivak, McClelland, Maier & Neustadt, L.L.P.

(57) ABSTRACT

When cold and in the non-coated state, the aerodynamic profile is substantially identical to a nominal profile determined by the Cartesian coordinates X,Y,Z' given in Table 1, in which the coordinate Z' is the quotient D/H where D is the distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

10 Claims, 2 Drawing Sheets

OPTIMIZED AERODYNAMIC PROFILE FOR A TURBINE BLADE, IN PARTICULAR FOR A ROTARY WHEEL OF THE FIRST STAGE OF A TURBINE

The present invention relates to an aerodynamic profile for a turbine blade.

In particular, the invention relates to the aerodynamic profile of a blade of a rotary wheel of a gas turbine, and more particularly of a low pressure turbine of the type used in a turbojet of an aircraft.

The invention relates in particular to a blade of the rotary wheel of the first stage of a turbine having a plurality of stages, preferably four stages.

Such a profile should enable the turbine to provide the desired efficiency, and in order to do that it must be such that the flow of air around the profile is sound, i.e. substantially such that it does not give rise to turbulence, which is harmful for overall efficiency.

It must be capable of being installed properly in the environment of the engine, and in particular, for the blade of a rotary wheel forming a portion of the rotor of the turbine, it must be capable of being fastened easily to the support disk of the rotary wheel, via the root of the blade, whereas its tip must be capable of carrying a top platform. Furthermore, this part must be capable of being obtained by casting, and must therefore present a profile that is compatible with that manufacturing technique.

Furthermore, the profile of the blade must enable it to withstand the mechanical stresses to which the blade is subjected, by enabling those stresses to be spread over the entire blade in such a manner as to avoid premature wear thereof. This spreading must apply both in static mode and in dynamic mode. In particular, it must be such that the blade, given its resonant modes, can withstand the highest dynamic loading for good operation of the turbine.

An object of the invention is to propose an aerodynamic profile for a turbine blade that is optimized, and capable of satisfying those objectives.

This object is achieved by the fact that when cold and in a non-coated state, said profile is substantially identical to a nominal profile determined by the Cartesian coordinates X,Y, Z' given in Table 1, in which the coordinate Z' is the quotient D/H where D is the distance of the point under consideration from a reference X,Y plane situated at the base of the nominal profile, and H is the height of said profile measured from said reference plane that is the intersection of the stacking axis of the set of blades and the axisymmetric surface of the hub, out to a second reference plane that is the intersection of said stacking axis with the axisymmetric surface of the casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The abovementioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the invention is defined in the non-coated state. Since turbine blades are subjected to high temperature gradients, it is common practice for them to be provided with a coating having thermal properties enabling them more easily to withstand such temperature variations. The profile is determined prior to installing such a coating.

It is stated above that the profile of the invention is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

This variation takes account in particular of manufacturing tolerances of the profile.

It is also preferable for the X,Y coordinates of the aerodynamic profile to lie within a range of ±5% relative to the X,Y coordinates of the nominal profile.

This variation takes account of the setting of the profile to adapt to the flow coming from the turbine vanes situated upstream, so as to further improve the efficiency of the turbine. In particular, the profile is adapted so as to be optimized for the flow coming from the nozzle of the first stage of a turbine, when the blade of the invention belongs to the rotary wheel of the first stage of a turbine.

For a blade of a rotary wheel, forming a portion of the rotor of a turbine, the profile serves to optimize the inter-blade flow, i.e. the flow between adjacent blades of the wheel, and thus transforms a maximum amount of the kinetic energy of the gaseous fluid into kinetic energy on the shaft of the turbine. In addition, it serves to orient the gaseous fluid correctly for the turbine vanes situated downstream, in particular belonging to the stationary nozzle of the next stage of the turbine.

The invention can be better understood and its advantages appear better on reading the following detailed description of an embodiment given by way of non-limiting example. The description refers to the accompanying drawings, in which.

Figure 1:
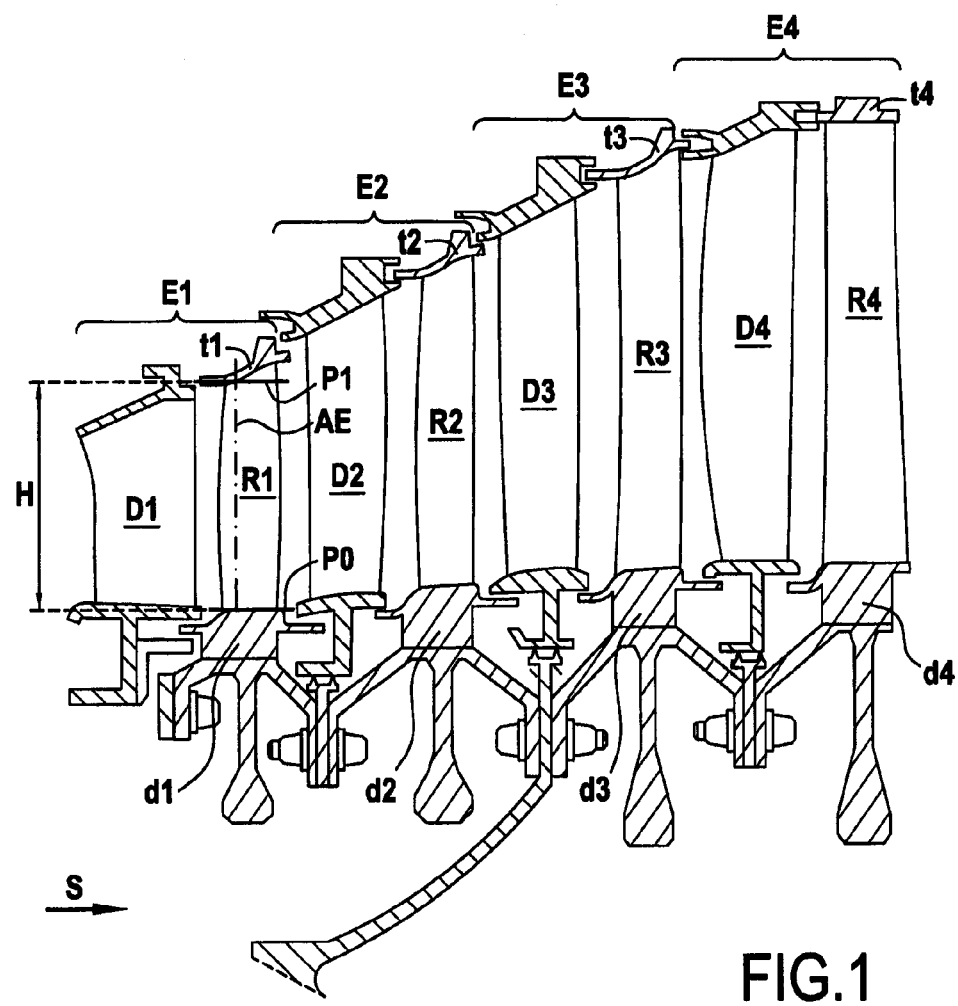
FIG. 1 is a fragmentary axial section view of a turbine including a blade of profile that corresponds to that of the invention.

The turbine shown in axial section in FIG. 1 comprises four stages referenced respectively E1 to E4. In the direction S going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages E1 to E4 are given references D1 to D4, whereas the blades of rotary wheels of stages E1 to E4 are given respective references R1 to R4.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The various disks designated by respective references d1 to d4 are constrained to rotate together. In the example shown, the tips of the blades of the rotary wheels, formed at their radially-outer ends, carry top platforms given respective references t1 to t4.

The invention relates in particular to the blade R1 which is a blade of the rotary wheel of the first stage E1 of the turbine.

Figure 2:
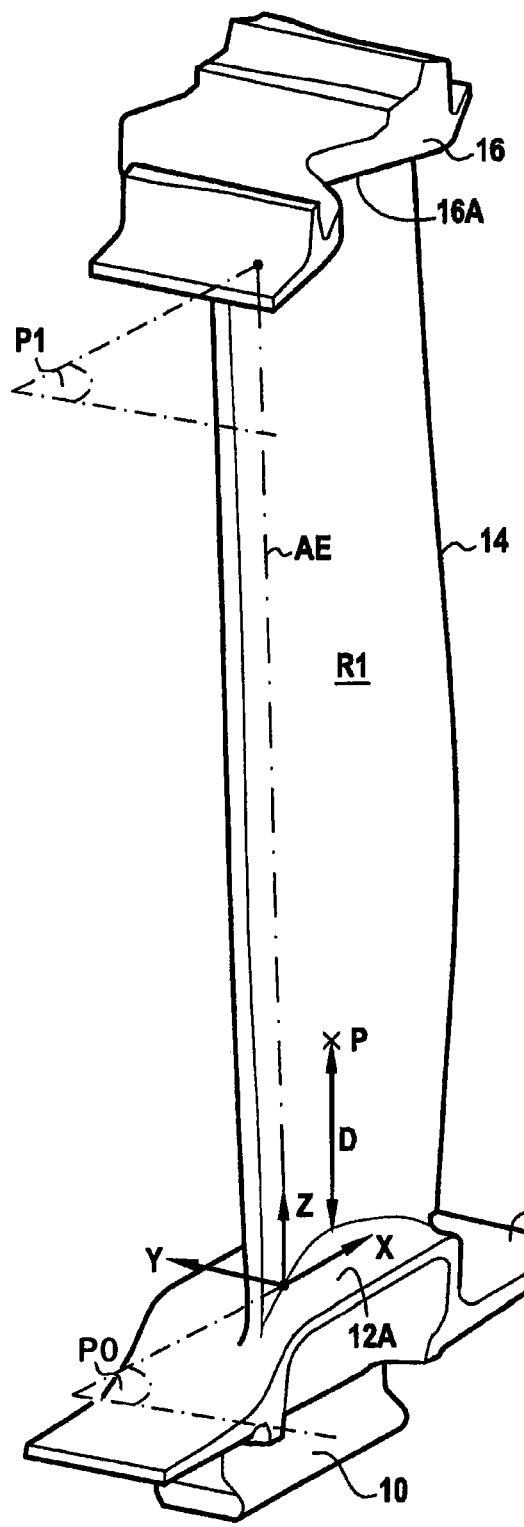
FIG. 2 is a perspective view of a blade to which the invention applies.

The blade R1 shown in FIG. 2 includes, at its radially-inner end, a blade root 10 enabling it to be connected to a support disk forming the hub of a turbine wheel, and a platform 12 from which an aerodynamic profile 14 extends. At its tip, formed at its radially-outer end remote from the platform 12, the blade includes a top platform 16 that forms an outer casing carried by the various blades of the wheel.

By convention, the aerodynamic profile 14 is the entire portion of said blade that extends radially from the platform 12 to the top platform 16.

In FIG. 2, there can be seen a frame of reference comprising Cartesian coordinates X,Y,Z. The radial direction Z is the height direction of the blade, which extends radially from its root to its tip. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the invention is determined is defined in following Table 1 of coordinates, in which the coordinates Z', measured along the axis Z is non-dimensional, whereas the dimensions X and Y, respectively measured along the axes X and Y, are expressed in millimeters.

TABLE 1

| X | Y | Z' | X | Y | Z' | X | Y | Z' |
|---|---|---|---|---|---|---|---|---|
| −9.48387 | −2.52247 | −0.102 | −9.33726 | −1.97903 | 0.197 | −7.17497 | 1.7123 | 0.894 |
| −9.50609 | −2.47343 | −0.102 | −9.37089 | −1.93461 | 0.197 | −7.21328 | 1.74863 | 0.894 |
| −9.52965 | −2.39881 | −0.102 | −9.40888 | −1.8631 | 0.197 | −7.25451 | 1.81334 | 0.894 |
| −9.54416 | −2.27891 | −0.102 | −9.44163 | −1.74247 | 0.197 | −7.28853 | 1.92678 | 0.894 |
| −9.52408 | −2.11183 | −0.102 | −9.44189 | −1.56833 | 0.197 | −7.29178 | 2.09176 | 0.894 |
| −9.44925 | −1.9052 | −0.102 | −9.38997 | −1.34691 | 0.197 | −7.2539 | 2.30391 | 0.894 |
| −9.31409 | −1.66645 | −0.102 | −9.28216 | −1.08426 | 0.197 | −7.17679 | 2.56164 | 0.894 |
| −9.11908 | −1.39881 | −0.102 | −9.12002 | −0.78235 | 0.197 | −7.06118 | 2.86509 | 0.894 |
| −8.86473 | −1.10403 | −0.102 | −8.89989 | −0.44488 | 0.197 | −6.90029 | 3.21131 | 0.894 |
| −8.55088 | −0.78414 | −0.102 | −8.61986 | −0.07521 | 0.197 | −6.68894 | 3.5966 | 0.894 |
| −8.17667 | −0.44233 | −0.102 | −8.28142 | 0.32549 | 0.197 | −6.42515 | 4.01779 | 0.894 |
| −7.74099 | −0.08306 | −0.102 | −7.88305 | 0.75305 | 0.197 | −6.10649 | 4.47066 | 0.894 |
| −7.24307 | 0.28829 | −0.102 | −7.42214 | 1.20109 | 0.197 | −5.72723 | 4.94725 | 0.894 |
| −6.68296 | 0.66594 | −0.102 | −6.89722 | 1.66279 | 0.197 | −5.28001 | 5.43592 | 0.894 |
| −6.06175 | 1.04424 | −0.102 | −6.30741 | 2.13042 | 0.197 | −4.75946 | 5.92347 | 0.894 |
| −5.38155 | 1.41783 | −0.102 | −5.65212 | 2.59469 | 0.197 | −4.16077 | 6.39322 | 0.894 |
| −4.64519 | 1.78136 | −0.102 | −4.93114 | 3.04459 | 0.197 | −3.47897 | 6.82171 | 0.894 |
| −3.85582 | 2.12872 | −0.102 | −4.14477 | 3.46664 | 0.197 | −2.71351 | 7.18119 | 0.894 |
| −3.01665 | 2.45199 | −0.102 | −3.29395 | 3.84372 | 0.197 | −1.87161 | 7.44352 | 0.894 |
| −2.13093 | 2.74046 | −0.102 | −2.38149 | 4.15468 | 0.197 | −0.96854 | 7.58068 | 0.894 |
| −1.20249 | 2.97996 | −0.102 | −1.4136 | 4.3732 | 0.197 | −0.02834 | 7.57413 | 0.894 |
| −0.23699 | 3.15359 | −0.102 | −0.40317 | 4.47129 | 0.197 | 0.92099 | 7.41889 | 0.894 |
| 0.75692 | 3.24197 | −0.102 | 0.62846 | 4.42627 | 0.197 | 1.85161 | 7.11666 | 0.894 |
| 1.76599 | 3.22563 | −0.102 | 1.65379 | 4.22765 | 0.197 | 2.73927 | 6.67918 | 0.894 |
| 2.7718 | 3.08916 | −0.102 | 2.64515 | 3.88044 | 0.197 | 3.56781 | 6.12764 | 0.894 |
| 3.75274 | 2.82746 | −0.102 | 3.58096 | 3.40283 | 0.197 | 4.32875 | 5.48572 | 0.894 |
| 4.68874 | 2.4483 | −0.102 | 4.44868 | 2.82038 | 0.197 | 5.01902 | 4.77567 | 0.894 |
| 5.56596 | 1.97039 | −0.102 | 5.24491 | 2.16105 | 0.197 | 5.64921 | 4.02573 | 0.894 |
| 6.37821 | 1.41749 | −0.102 | 5.97136 | 1.44956 | 0.197 | 6.2208 | 3.25008 | 0.894 |
| 7.1249 | 0.81271 | −0.102 | 6.63233 | 0.70665 | 0.197 | 6.7409 | 2.4644 | 0.894 |
| 7.8078 | 0.17541 | −0.102 | 7.23396 | −0.04994 | 0.197 | 7.21517 | 1.68081 | 0.894 |
| 8.43121 | −0.47697 | −0.102 | 7.78337 | −0.80502 | 0.197 | 7.64846 | 0.90932 | 0.894 |
| 8.99976 | −1.13021 | −0.102 | 8.28526 | −1.5475 | 0.197 | 8.04566 | 0.15874 | 0.894 |
| 9.51719 | −1.77325 | −0.102 | 8.74376 | −2.26816 | 0.197 | 8.40996 | −0.56398 | 0.894 |
| 9.98631 | −2.39743 | −0.102 | 9.16296 | −2.95894 | 0.197 | 8.74382 | −1.25302 | 0.894 |
| 10.40913 | −2.99586 | −0.102 | 9.54544 | −3.61367 | 0.197 | 9.04947 | −1.90326 | 0.894 |
| 10.78717 | −3.563 | −0.102 | 9.89282 | −4.22756 | 0.197 | 9.3288 | −2.51046 | 0.894 |
| 11.12164 | −4.09442 | −0.102 | 10.2066 | −4.79658 | 0.197 | 9.58296 | −3.07128 | 0.894 |
| 11.41368 | −4.58652 | −0.102 | 10.48804 | −5.3176 | 0.197 | 9.81276 | −3.58319 | 0.894 |
| 11.66461 | −5.03644 | −0.102 | 10.73822 | −5.78838 | 0.197 | 10.01919 | −4.04425 | 0.894 |
| 11.87154 | −5.44429 | −0.102 | 10.95806 | −6.20751 | 0.197 | 10.20284 | −4.45339 | 0.894 |
| 11.96432 | −5.8328 | −0.102 | 11.1484 | −6.57444 | 0.197 | 10.36343 | −4.81064 | 0.894 |
| 11.93535 | −6.17382 | −0.102 | 11.31023 | −6.88949 | 0.197 | 10.50031 | −5.11706 | 0.894 |
| 11.84289 | −6.44496 | −0.102 | 11.44454 | −7.15377 | 0.197 | 10.61586 | −5.37311 | 0.894 |
| 11.7231 | −6.64483 | −0.102 | 11.55475 | −7.36825 | 0.197 | 10.7077 | −5.58232 | 0.894 |
| 11.60474 | −6.78398 | −0.102 | 11.63592 | −7.53899 | 0.197 | 10.77047 | −5.75011 | 0.894 |
| 11.50355 | −6.87553 | −0.102 | 11.66001 | −7.67813 | 0.197 | 10.77104 | −5.88391 | 0.894 |
| 11.427 | −6.93223 | −0.102 | 11.63049 | −7.77219 | 0.197 | 10.7295 | −5.96758 | 0.894 |
| 11.37664 | −6.96502 | −0.102 | 11.59 | −7.81939 | 0.197 | 10.68731 | −6.00872 | 0.894 |
| 11.33704 | −6.98875 | −0.102 | 11.55079 | −7.84669 | 0.197 | 10.6487 | −6.03235 | 0.894 |
| 11.30354 | −7.00693 | −0.102 | 11.51427 | −7.86297 | 0.197 | 10.61009 | −6.04729 | 0.894 |
| 11.25921 | −7.02919 | −0.102 | 11.4635 | −7.87442 | 0.197 | 10.55704 | −6.05673 | 0.894 |
| 11.18728 | −7.06099 | −0.102 | 11.38142 | −7.86605 | 0.197 | 10.47237 | −6.04547 | 0.894 |
| 11.08106 | −7.09848 | −0.102 | 11.28138 | −7.80314 | 0.197 | 10.37136 | −5.97642 | 0.894 |
| 10.93424 | −7.13296 | −0.102 | 11.18342 | −7.6789 | 0.197 | 10.27769 | −5.84203 | 0.894 |
| 10.74272 | −7.15095 | −0.102 | 11.07461 | −7.50894 | 0.197 | 10.17802 | −5.65841 | 0.894 |
| 10.507 | −7.13183 | −0.102 | 10.93568 | −7.30338 | 0.197 | 10.05572 | −5.43252 | 0.894 |
| 10.2362 | −7.05124 | −0.102 | 10.7719 | −7.05634 | 0.197 | 9.91541 | −5.1596 | 0.894 |
| 9.95246 | −6.88323 | −0.102 | 10.57992 | −6.76855 | 0.197 | 9.75181 | −4.84098 | 0.894 |
| 9.69649 | −6.6057 | −0.102 | 10.35789 | −6.44055 | 0.197 | 9.56456 | −4.47615 | 0.894 |
| 9.46397 | −6.2496 | −0.102 | 10.10445 | −6.07336 | 0.197 | 9.35481 | −4.06459 | 0.894 |
| 9.20475 | −5.85468 | −0.102 | 9.81895 | −5.66827 | 0.197 | 9.1237 | −3.60649 | 0.894 |
| 8.91643 | −5.4239 | −0.102 | 9.50046 | −5.22749 | 0.197 | 8.87126 | −3.10322 | 0.894 |
| 8.59625 | −4.9612 | −0.102 | 9.1476 | −4.75425 | 0.197 | 8.59674 | −2.55719 | 0.894 |
| 8.24061 | −4.4719 | −0.102 | 8.75878 | −4.25274 | 0.197 | 8.2996 | −1.97122 | 0.894 |

TABLE 1-continued

| X | Y | Z' | X | Y | Z' | X | Y | Z' |
|---|---|---|---|---|---|---|---|---|
| 7.84516 | −3.96287 | −0.102 | 8.33235 | −3.72791 | 0.197 | 7.97929 | −1.34866 | 0.894 |
| 7.40495 | −3.44278 | −0.102 | 7.866 | −3.18616 | 0.197 | 7.63399 | −0.69407 | 0.894 |
| 6.91476 | −2.92238 | −0.102 | 7.35709 | −2.63522 | 0.197 | 7.26111 | −0.01294 | 0.894 |
| 6.36949 | −2.41484 | −0.102 | 6.80359 | −2.08352 | 0.197 | 6.85766 | 0.68841 | 0.894 |
| 5.76517 | −1.93588 | −0.102 | 6.2035 | −1.54102 | 0.197 | 6.41985 | 1.40241 | 0.894 |
| 5.1003 | −1.50323 | −0.102 | 5.555 | −1.01949 | 0.197 | 5.94341 | 2.12028 | 0.894 |
| 4.37758 | −1.13493 | −0.102 | 4.85743 | −0.53211 | 0.197 | 5.42251 | 2.83085 | 0.894 |
| 3.60501 | −0.84645 | −0.102 | 4.11237 | −0.09235 | 0.197 | 4.85021 | 3.5199 | 0.894 |
| 2.79546 | −0.6473 | −0.102 | 3.32411 | 0.28659 | 0.197 | 4.22342 | 4.17343 | 0.894 |
| 1.96436 | −0.53899 | −0.102 | 2.49914 | 0.59077 | 0.197 | 3.53601 | 4.77023 | 0.894 |
| 1.12676 | −0.51534 | −0.102 | 1.64693 | 0.80643 | 0.197 | 2.7889 | 5.29001 | 0.894 |
| 0.29512 | −0.56513 | −0.102 | 0.78083 | 0.92394 | 0.197 | 1.98892 | 5.71298 | 0.894 |
| −0.52133 | −0.6745 | −0.102 | −0.08318 | 0.94123 | 0.197 | 1.14953 | 6.02275 | 0.894 |
| −1.31618 | −0.82963 | −0.102 | −0.92943 | 0.86588 | 0.197 | 0.28981 | 6.20877 | 0.894 |
| −2.08511 | −1.01747 | −0.102 | −1.74565 | 0.71306 | 0.197 | −0.56772 | 6.27043 | 0.894 |
| −2.82515 | −1.22651 | −0.102 | −2.52427 | 0.50189 | 0.197 | −1.40102 | 6.21346 | 0.894 |
| −3.53402 | −1.44708 | −0.102 | −3.26176 | 0.25151 | 0.197 | −2.19017 | 6.04776 | 0.894 |
| −4.20984 | −1.67098 | −0.102 | −3.95708 | −0.02124 | 0.197 | −2.91849 | 5.78792 | 0.894 |
| −4.8511 | −1.89093 | −0.102 | −4.6103 | −0.30254 | 0.197 | −3.57508 | 5.45461 | 0.894 |
| −5.45695 | −2.09922 | −0.102 | −5.2215 | −0.58211 | 0.197 | −4.1545 | 5.06927 | 0.894 |
| −6.02525 | −2.29302 | −0.102 | −5.79073 | −0.85186 | 0.197 | −4.65642 | 4.65285 | 0.894 |
| −6.55537 | −2.46615 | −0.102 | −6.31812 | −1.10513 | 0.197 | −5.08504 | 4.22484 | 0.894 |
| −7.04601 | −2.61517 | −0.102 | −6.80319 | −1.33771 | 0.197 | −5.44789 | 3.80232 | 0.894 |
| −7.49605 | −2.73681 | −0.102 | −7.24539 | −1.54663 | 0.197 | −5.75358 | 3.39865 | 0.894 |
| −7.90435 | −2.82817 | −0.102 | −7.64432 | −1.72974 | 0.197 | −6.0097 | 3.02324 | 0.894 |
| −8.26965 | −2.88673 | −0.102 | −8.00091 | −1.88296 | 0.197 | −6.22572 | 2.68441 | 0.894 |
| −8.5902 | −2.91019 | −0.102 | −8.31706 | −2.00021 | 0.197 | −6.41069 | 2.38834 | 0.894 |
| −8.86326 | −2.89701 | −0.102 | −8.59214 | −2.08135 | 0.197 | −6.57202 | 2.13906 | 0.894 |
| −9.08454 | −2.84873 | −0.102 | −8.82521 | −2.12757 | 0.197 | −6.71194 | 1.93673 | 0.894 |
| −9.24981 | −2.77387 | −0.102 | −9.01549 | −2.13225 | 0.197 | −6.83786 | 1.78515 | 0.894 |
| −9.36028 | −2.68965 | −0.102 | −9.15784 | −2.10106 | 0.197 | −6.95897 | 1.69516 | 0.894 |
| −9.42645 | −2.61506 | −0.102 | −9.25136 | −2.05419 | 0.197 | −7.06487 | 1.67249 | 0.894 |
| −9.46236 | −2.56137 | −0.102 | −9.30478 | −2.01249 | 0.197 | −7.13333 | 1.68787 | 0.894 |
| −9.48387 | −2.52247 | −0.102 | −9.33726 | −1.97903 | 0.197 | −7.17497 | 1.7123 | 0.894 |
| −9.48406 | −2.56532 | −0.052 | −9.11355 | −1.63922 | 0.296 | −7.11112 | 1.95568 | 0.918 |
| −9.50576 | −2.51587 | −0.052 | −9.15138 | −1.59632 | 0.296 | −7.15002 | 1.99097 | 0.918 |
| −9.52888 | −2.44086 | −0.052 | −9.19448 | −1.52524 | 0.296 | −7.19618 | 2.05175 | 0.918 |
| −9.54313 | −2.32054 | −0.052 | −9.23286 | −1.40281 | 0.296 | −7.24267 | 2.15999 | 0.918 |
| −9.52238 | −2.15302 | −0.052 | −9.23841 | −1.22414 | 0.296 | −7.26219 | 2.32296 | 0.918 |
| −9.44608 | −1.94619 | −0.052 | −9.19271 | −0.9952 | 0.296 | −7.23308 | 2.53534 | 0.918 |
| −9.30869 | −1.70774 | −0.052 | −9.09301 | −0.72133 | 0.296 | −7.15805 | 2.7922 | 0.918 |
| −9.11067 | −1.44103 | −0.052 | −8.93946 | −0.40483 | 0.296 | −7.04283 | 3.09396 | 0.918 |
| −8.85267 | −1.14783 | −0.052 | −8.72839 | −0.04915 | 0.296 | −6.88132 | 3.43766 | 0.918 |
| −8.53457 | −0.83019 | −0.052 | −8.45789 | 0.3426 | 0.296 | −6.66675 | 3.81849 | 0.918 |
| −8.15554 | −0.49135 | −0.052 | −8.12904 | 0.7689 | 0.296 | −6.39658 | 4.23248 | 0.918 |
| −7.7145 | −0.13588 | −0.052 | −7.73975 | 1.22533 | 0.296 | −6.06898 | 4.67528 | 0.918 |
| −7.21075 | 0.23081 | −0.052 | −7.2871 | 1.70542 | 0.296 | −5.68047 | 5.14017 | 0.918 |
| −6.64442 | 0.60291 | −0.052 | −6.76902 | 2.20198 | 0.296 | −5.22568 | 5.61696 | 0.918 |
| −6.01681 | 0.97496 | −0.052 | −6.18394 | 2.70662 | 0.296 | −4.70011 | 6.09349 | 0.918 |
| −5.33027 | 1.34192 | −0.052 | −5.52955 | 3.20802 | 0.296 | −4.10019 | 6.55507 | 0.918 |
| −4.58785 | 1.69886 | −0.052 | −4.80443 | 3.69303 | 0.296 | −3.41686 | 6.97301 | 0.918 |
| −3.79295 | 2.04018 | −0.052 | −4.00766 | 4.14521 | 0.296 | −2.64848 | 7.31531 | 0.918 |
| −2.94891 | 2.35856 | −0.052 | −3.13946 | 4.54377 | 0.296 | −1.80449 | 7.55425 | 0.918 |
| −2.0591 | 2.64379 | −0.052 | −2.20282 | 4.86302 | 0.296 | −0.9024 | 7.66274 | 0.918 |
| −1.12729 | 2.88214 | −0.052 | −1.2059 | 5.07185 | 0.296 | 0.03195 | 7.62211 | 0.918 |
| −0.15896 | 3.05732 | −0.052 | −0.16591 | 5.13831 | 0.296 | 0.9691 | 7.42898 | 0.918 |
| 0.83765 | 3.15028 | −0.052 | 0.88944 | 5.03915 | 0.296 | 1.88235 | 7.09245 | 0.918 |
| 1.84995 | 3.141 | −0.052 | 1.92676 | 4.76837 | 0.296 | 2.75019 | 6.62787 | 0.918 |
| 2.86021 | 3.01422 | −0.052 | 2.91617 | 4.33974 | 0.296 | 3.55861 | 6.05634 | 0.918 |
| 3.84795 | 2.76616 | −0.052 | 3.83843 | 3.78063 | 0.296 | 4.30249 | 5.40268 | 0.918 |
| 4.79263 | 2.40039 | −0.052 | 4.68585 | 3.12278 | 0.296 | 4.98201 | 4.68956 | 0.918 |
| 5.67972 | 1.93435 | −0.052 | 5.4601 | 2.39707 | 0.296 | 5.601 | 3.93707 | 0.918 |
| 6.50198 | 1.39087 | −0.052 | 6.16653 | 1.62864 | 0.296 | 6.16487 | 3.16209 | 0.918 |
| 7.25814 | 0.79315 | −0.052 | 6.81068 | 0.83681 | 0.296 | 6.67957 | 2.37883 | 0.918 |
| 7.95039 | 0.1617 | −0.052 | 7.39844 | 0.03735 | 0.296 | 7.15034 | 1.59879 | 0.918 |
| 8.58181 | −0.48687 | −0.052 | 7.93724 | −0.75547 | 0.296 | 7.58149 | 0.83148 | 0.918 |
| 9.15755 | −1.13737 | −0.052 | 8.4316 | −1.53131 | 0.296 | 7.97748 | 0.08535 | 0.918 |
| 9.68211 | −1.77795 | −0.052 | 8.88492 | −2.28183 | 0.296 | 8.34138 | −0.63278 | 0.918 |
| 10.15777 | −2.40021 | −0.052 | 9.30077 | −2.99952 | 0.296 | 8.67523 | −1.31731 | 0.918 |
| 10.58631 | −2.99736 | −0.052 | 9.68151 | −3.67841 | 0.296 | 8.98092 | −1.96332 | 0.918 |
| 10.96836 | −3.56438 | −0.052 | 10.02848 | −4.31393 | 0.296 | 9.26026 | −2.56661 | 0.918 |
| 11.30506 | −4.09669 | −0.052 | 10.3428 | −4.90226 | 0.296 | 9.51418 | −3.12395 | 0.918 |
| 11.59782 | −4.59043 | −0.052 | 10.62543 | −5.44045 | 0.296 | 9.74345 | −3.63284 | 0.918 |
| 11.84813 | −5.04254 | −0.052 | 10.87719 | −5.92636 | 0.296 | 9.9492 | −4.09127 | 0.918 |
| 12.04969 | −5.45465 | −0.052 | 11.09882 | −6.3587 | 0.296 | 10.13209 | −4.49815 | 0.918 |
| 12.10304 | −5.85176 | −0.052 | 11.2911 | −6.73695 | 0.296 | 10.29188 | −4.85348 | 0.918 |
| 12.03077 | −6.18738 | −0.052 | 11.45487 | −7.06155 | 0.296 | 10.42777 | −5.1584 | 0.918 |
| 11.90651 | −6.44649 | −0.052 | 11.5912 | −7.33362 | 0.296 | 10.54262 | −5.41313 | 0.918 |

TABLE 1-continued

| X | Y | Z' | X | Y | Z' | X | Y | Z' |
|---|---|---|---|---|---|---|---|---|
| 11.76214 | −6.63032 | −0.052 | 11.70295 | −7.55449 | 0.296 | 10.63282 | −5.62174 | 0.918 |
| 11.62428 | −6.75105 | −0.052 | 11.78627 | −7.72976 | 0.296 | 10.69416 | −5.78904 | 0.918 |
| 11.51168 | −6.82888 | −0.052 | 11.81266 | −7.8723 | 0.296 | 10.69505 | −5.92213 | 0.918 |
| 11.43027 | −6.87892 | −0.052 | 11.78385 | −7.96931 | 0.296 | 10.65349 | −6.00524 | 0.918 |
| 11.37858 | −6.90993 | −0.052 | 11.74246 | −8.01791 | 0.296 | 10.61139 | −6.04602 | 0.918 |
| 11.33866 | −6.93342 | −0.052 | 11.70212 | −8.0458 | 0.296 | 10.57293 | −6.06944 | 0.918 |
| 11.30539 | −6.9521 | −0.052 | 11.66439 | −8.06229 | 0.296 | 10.53458 | −6.08425 | 0.918 |
| 11.26216 | −6.97657 | −0.052 | 11.61197 | −8.07342 | 0.296 | 10.4819 | −6.0937 | 0.918 |
| 11.19387 | −7.01577 | −0.052 | 11.52765 | −8.06308 | 0.296 | 10.39775 | −6.08292 | 0.918 |
| 11.09492 | −7.06991 | −0.052 | 11.42616 | −7.99595 | 0.296 | 10.297 | −6.01498 | 0.918 |
| 10.9543 | −7.12495 | −0.052 | 11.3273 | −7.86646 | 0.296 | 10.203 | −5.8822 | 0.918 |
| 10.76504 | −7.16071 | −0.052 | 11.21701 | −7.69036 | 0.296 | 10.10421 | −5.69971 | 0.918 |
| 10.52886 | −7.1778 | −0.052 | 11.0761 | −7.47727 | 0.296 | 9.98276 | −5.47536 | 0.918 |
| 10.24918 | −7.13524 | −0.052 | 10.9101 | −7.22116 | 0.296 | 9.84345 | −5.20427 | 0.918 |
| 9.94654 | −7.00319 | −0.052 | 10.716 | −6.92249 | 0.296 | 9.6807 | −4.88797 | 0.918 |
| 9.67185 | −6.74349 | −0.052 | 10.49242 | −6.5814 | 0.296 | 9.49432 | −4.52584 | 0.918 |
| 9.44089 | −6.38573 | −0.052 | 10.23842 | −6.1986 | 0.296 | 9.28557 | −4.1173 | 0.918 |
| 9.18411 | −5.98849 | −0.052 | 9.95366 | −5.77515 | 0.296 | 9.0555 | −3.6626 | 0.918 |
| 8.89935 | −5.55455 | −0.052 | 9.63758 | −5.31294 | 0.296 | 8.80407 | −3.16313 | 0.918 |
| 8.5835 | −5.088 | −0.052 | 9.28926 | −4.81482 | 0.296 | 8.53058 | −2.62124 | 0.918 |
| 8.23278 | −4.59422 | −0.052 | 8.90761 | −4.28446 | 0.296 | 8.23462 | −2.0397 | 0.918 |
| 7.84246 | −4.0802 | −0.052 | 8.4916 | −3.7261 | 0.296 | 7.91573 | −1.42178 | 0.918 |
| 7.40705 | −3.55494 | −0.052 | 8.03946 | −3.14531 | 0.296 | 7.57235 | −0.77188 | 0.918 |
| 6.92099 | −3.02942 | −0.052 | 7.54879 | −2.54894 | 0.296 | 7.20215 | −0.09533 | 0.918 |
| 6.38229 | −2.51353 | −0.052 | 7.01773 | −1.94439 | 0.296 | 6.80237 | 0.60176 | 0.918 |
| 5.78332 | −2.02631 | −0.052 | 6.44402 | −1.3405 | 0.296 | 6.36958 | 1.31214 | 0.918 |
| 5.12138 | −1.58734 | −0.052 | 5.82481 | −0.74819 | 0.296 | 5.89953 | 2.02719 | 0.918 |
| 4.39898 | −1.21612 | −0.052 | 5.15736 | −0.1805 | 0.296 | 5.38703 | 2.73642 | 0.918 |
| 3.62452 | −0.92968 | −0.052 | 4.44028 | 0.34806 | 0.296 | 4.82654 | 3.42727 | 0.918 |
| 2.81194 | −0.7385 | −0.052 | 3.67425 | 0.82158 | 0.296 | 4.21318 | 4.08499 | 0.918 |
| 1.97816 | −0.64327 | −0.052 | 2.86194 | 1.22136 | 0.296 | 3.54256 | 4.69138 | 0.918 |
| 1.13919 | −0.635 | −0.052 | 2.00992 | 1.52693 | 0.296 | 2.81422 | 5.22673 | 0.918 |
| 0.30746 | −0.69934 | −0.052 | 1.13125 | 1.72156 | 0.296 | 2.03313 | 5.67128 | 0.918 |
| −0.50845 | −0.82013 | −0.052 | 0.24467 | 1.79746 | 0.296 | 1.21101 | 6.00856 | 0.918 |
| −1.30288 | −0.98265 | −0.052 | −0.62931 | 1.75946 | 0.296 | 0.36552 | 6.22846 | 0.918 |
| −2.07228 | −1.17286 | −0.052 | −1.4735 | 1.62366 | 0.296 | −0.48278 | 6.32585 | 0.918 |
| −2.81404 | −1.37944 | −0.052 | −2.27684 | 1.41227 | 0.296 | −1.31198 | 6.30154 | 0.918 |
| −3.52508 | −1.59623 | −0.052 | −3.03391 | 1.14775 | 0.296 | −2.0988 | 6.15228 | 0.918 |
| −4.20335 | −1.81559 | −0.052 | −3.74327 | 0.85068 | 0.296 | −2.821 | 5.891 | 0.918 |
| −4.84715 | −2.03078 | −0.052 | −4.40536 | 0.53773 | 0.296 | −3.47506 | 5.56383 | 0.918 |
| −5.45563 | −2.23385 | −0.052 | −5.02083 | 0.22131 | 0.296 | −4.05867 | 5.19367 | 0.918 |
| −6.0266 | −2.42216 | −0.052 | −5.59052 | −0.08877 | 0.296 | −4.5631 | 4.78735 | 0.918 |
| −6.55939 | −2.58929 | −0.052 | −6.11504 | −0.38503 | 0.296 | −4.99303 | 4.36655 | 0.918 |
| −7.05266 | −2.73177 | −0.052 | −6.59481 | −0.66186 | 0.296 | −5.35539 | 3.94861 | 0.918 |
| −7.50522 | −2.84612 | −0.052 | −7.02981 | −0.91557 | 0.296 | −5.65951 | 3.5481 | 0.918 |
| −7.91582 | −2.9293 | −0.052 | −7.42015 | −1.14342 | 0.296 | −5.91418 | 3.17545 | 0.918 |
| −8.28295 | −2.97865 | −0.052 | −7.76757 | −1.34092 | 0.296 | −6.13029 | 2.83994 | 0.918 |
| −8.60451 | −2.99179 | −0.052 | −8.07536 | −1.50156 | 0.296 | −6.31667 | 2.54757 | 0.918 |
| −8.87716 | −2.96749 | −0.052 | −8.34424 | −1.62366 | 0.296 | −6.47942 | 2.30164 | 0.918 |
| −9.09608 | −2.9083 | −0.052 | −8.57345 | −1.70923 | 0.296 | −6.62157 | 2.10293 | 0.918 |
| −9.25741 | −2.8248 | −0.052 | −8.76554 | −1.74809 | 0.296 | −6.76027 | 1.96485 | 0.918 |
| −9.36417 | −2.73564 | −0.052 | −8.91543 | −1.74106 | 0.296 | −6.89761 | 1.90489 | 0.918 |
| −9.4282 | −2.65904 | −0.052 | −9.01758 | −1.7069 | 0.296 | −7.00516 | 1.90626 | 0.918 |
| −9.46309 | −2.60458 | −0.052 | −9.07709 | −1.67046 | 0.296 | −7.07073 | 1.92985 | 0.918 |
| −9.48406 | −2.56532 | −0.052 | −9.11355 | −1.63922 | 0.296 | −7.11112 | 1.95568 | 0.918 |
| −9.48341 | −2.52522 | −0.003 | −8.81117 | −1.23959 | 0.396 | −7.11422 | 2.12715 | 0.943 |
| −9.50564 | −2.47618 | −0.003 | −8.8517 | −1.19815 | 0.396 | −7.15348 | 2.16207 | 0.943 |
| −9.52922 | −2.40157 | −0.003 | −8.89788 | −1.12771 | 0.396 | −7.20258 | 2.22055 | 0.943 |
| −9.54376 | −2.28167 | −0.003 | −8.9395 | −1.00453 | 0.396 | −7.25907 | 2.32399 | 0.943 |
| −9.52372 | −2.1146 | −0.003 | −8.94846 | −0.8236 | 0.396 | −7.30053 | 2.48288 | 0.943 |
| −9.44894 | −1.90794 | −0.003 | −8.90769 | −0.59056 | 0.396 | −7.30052 | 2.69735 | 0.943 |
| −9.31384 | −1.66916 | −0.003 | −8.81507 | −0.31011 | 0.396 | −7.24504 | 2.95926 | 0.943 |
| −9.11889 | −1.40147 | −0.003 | −8.67071 | 0.01584 | 0.396 | −7.13763 | 3.26404 | 0.943 |
| −8.86462 | −1.10663 | −0.003 | −8.47119 | 0.38444 | 0.396 | −6.97861 | 3.6091 | 0.943 |
| −8.55085 | −0.78667 | −0.003 | −8.21227 | 0.79149 | 0.396 | −6.76222 | 3.98913 | 0.943 |
| −8.17671 | −0.44476 | −0.003 | −7.89447 | 1.23499 | 0.396 | −6.48506 | 4.39877 | 0.943 |
| −7.74112 | −0.08538 | −0.003 | −7.51727 | 1.71174 | 0.396 | −6.14599 | 4.83317 | 0.943 |
| −7.2433 | 0.28608 | −0.003 | −7.07708 | 2.21507 | 0.396 | −5.74369 | 5.28655 | 0.943 |
| −6.68328 | 0.66387 | −0.003 | −6.56919 | 2.73555 | 0.396 | −5.27514 | 5.75026 | 0.943 |
| −6.06216 | 1.04232 | −0.003 | −5.99196 | 3.26458 | 0.396 | −4.73751 | 6.21365 | 0.943 |
| −5.38205 | 1.41608 | −0.003 | −5.34368 | 3.79153 | 0.396 | −4.1309 | 6.66701 | 0.943 |
| −4.64578 | 1.77979 | −0.003 | −4.6207 | 4.30028 | 0.396 | −3.4482 | 7.08668 | 0.943 |
| −3.8565 | 2.12734 | −0.003 | −3.82193 | 4.77345 | 0.396 | −2.68046 | 7.4314 | 0.943 |
| −3.01741 | 2.45081 | −0.003 | −2.94694 | 5.18767 | 0.396 | −1.83426 | 7.66394 | 0.943 |
| −2.13175 | 2.7395 | −0.003 | −1.99894 | 5.51462 | 0.396 | −0.92982 | 7.75507 | 0.943 |
| −1.20338 | 2.97923 | −0.003 | −0.98758 | 5.72094 | 0.396 | 0.00349 | 7.68865 | 0.943 |
| −0.23792 | 3.1531 | −0.003 | 0.0672 | 5.77265 | 0.396 | 0.93478 | 7.46702 | 0.943 |
| 0.75597 | 3.24172 | −0.003 | 1.13351 | 5.64287 | 0.396 | 1.83824 | 7.1038 | 0.943 |

TABLE 1-continued

| X | Y | Z' | X | Y | Z' | X | Y | Z' |
|---|---|---|---|---|---|---|---|---|
| 1.76505 | 3.22563 | −0.003 | 2.17503 | 5.33373 | 0.396 | 2.69462 | 6.61749 | 0.943 |
| 2.77089 | 3.0894 | −0.003 | 3.16066 | 4.86202 | 0.396 | 3.49217 | 6.0301 | 0.943 |
| 3.75189 | 2.82794 | −0.003 | 4.07224 | 4.25911 | 0.396 | 4.22684 | 5.36542 | 0.943 |
| 4.68798 | 2.44901 | −0.003 | 4.90289 | 3.55774 | 0.396 | 4.90043 | 4.64606 | 0.943 |
| 5.56532 | 1.97132 | −0.003 | 5.6589 | 2.79294 | 0.396 | 5.51594 | 3.89012 | 0.943 |
| 6.37771 | 1.41861 | −0.003 | 6.3477 | 1.99019 | 0.396 | 6.07826 | 3.11347 | 0.943 |
| 7.12455 | 0.81402 | −0.003 | 6.97586 | 1.16835 | 0.396 | 6.59272 | 2.32952 | 0.943 |
| 7.8076 | 0.17688 | −0.003 | 7.54907 | 0.34219 | 0.396 | 7.06408 | 1.54934 | 0.943 |
| 8.43117 | −0.47534 | −0.003 | 8.07476 | −0.47468 | 0.396 | 7.49704 | 0.78257 | 0.943 |
| 8.99988 | −1.12844 | −0.003 | 8.55773 | −1.27209 | 0.396 | 7.89437 | 0.03671 | 0.943 |
| 9.51747 | −1.77136 | −0.003 | 9.00126 | −2.042 | 0.396 | 8.25929 | −0.68133 | 0.943 |
| 9.98674 | −2.39543 | −0.003 | 9.40864 | −2.77724 | 0.396 | 8.59362 | −1.36602 | 0.943 |
| 10.4097 | −2.99375 | −0.003 | 9.78245 | −3.47183 | 0.396 | 8.89958 | −2.01228 | 0.943 |
| 10.78789 | −3.5608 | −0.003 | 10.124 | −4.12124 | 0.396 | 9.17942 | −2.61568 | 0.943 |
| 11.12248 | −4.09214 | −0.003 | 10.43413 | −4.72185 | 0.396 | 9.43381 | −3.17313 | 0.943 |
| 11.41465 | −4.58416 | −0.003 | 10.71361 | −5.27082 | 0.396 | 9.66418 | −3.68181 | 0.943 |
| 11.66568 | −5.03402 | −0.003 | 10.96311 | −5.76611 | 0.396 | 9.87065 | −4.14017 | 0.943 |
| 11.87272 | −5.44182 | −0.003 | 11.18326 | −6.20648 | 0.396 | 10.05393 | −4.5471 | 0.943 |
| 11.96559 | −5.83031 | −0.003 | 11.37469 | −6.59152 | 0.396 | 10.21414 | −4.90245 | 0.943 |
| 11.9367 | −6.17134 | −0.003 | 11.5381 | −6.92174 | 0.396 | 10.35066 | −5.20725 | 0.943 |
| 11.84431 | −6.4425 | −0.003 | 11.67448 | −7.19833 | 0.396 | 10.46417 | −5.46272 | 0.943 |
| 11.72457 | −6.6424 | −0.003 | 11.78641 | −7.42282 | 0.396 | 10.55652 | −5.67051 | 0.943 |
| 11.60624 | −6.78158 | −0.003 | 11.86993 | −7.60087 | 0.396 | 10.61881 | −5.83755 | 0.943 |
| 11.50508 | −6.87315 | −0.003 | 11.89583 | −7.74546 | 0.396 | 10.61869 | −5.97071 | 0.943 |
| 11.42854 | −6.92987 | −0.003 | 11.86628 | −7.84366 | 0.396 | 10.57638 | −6.05348 | 0.943 |
| 11.37819 | −6.96268 | −0.003 | 11.82417 | −7.89277 | 0.396 | 10.53384 | −6.09385 | 0.943 |
| 11.33859 | −6.98641 | −0.003 | 11.78322 | −7.92093 | 0.396 | 10.49526 | −6.1171 | 0.943 |
| 11.3051 | −7.0046 | −0.003 | 11.74459 | −7.93771 | 0.396 | 10.45708 | −6.1319 | 0.943 |
| 11.26077 | −7.02687 | −0.003 | 11.69091 | −7.94889 | 0.396 | 10.40467 | −6.14165 | 0.943 |
| 11.18885 | −7.05869 | −0.003 | 11.60474 | −7.93765 | 0.396 | 10.32074 | −6.13193 | 0.943 |
| 11.08263 | −7.09621 | −0.003 | 11.50187 | −7.86755 | 0.396 | 10.21944 | −6.0657 | 0.943 |
| 10.93583 | −7.13073 | −0.003 | 11.40262 | −7.73367 | 0.396 | 10.12471 | −5.93425 | 0.943 |
| 10.74431 | −7.14876 | −0.003 | 11.29198 | −7.55215 | 0.396 | 10.02591 | −5.75272 | 0.943 |
| 10.50859 | −7.1297 | −0.003 | 11.15089 | −7.33217 | 0.396 | 9.90576 | −5.52883 | 0.943 |
| 10.23777 | −7.04917 | −0.003 | 10.98502 | −7.06765 | 0.396 | 9.76731 | −5.25868 | 0.943 |
| 9.95399 | −6.88123 | −0.003 | 10.79158 | −6.75883 | 0.396 | 9.60501 | −4.94376 | 0.943 |
| 9.69795 | −6.60376 | −0.003 | 10.56957 | −6.40558 | 0.396 | 9.41899 | −4.58328 | 0.943 |
| 9.46534 | −6.24773 | −0.003 | 10.31834 | −6.00839 | 0.396 | 9.21039 | −4.17675 | 0.943 |
| 9.20603 | −5.85287 | −0.003 | 10.03787 | −5.5681 | 0.396 | 8.98039 | −3.72431 | 0.943 |
| 8.9176 | −5.42216 | −0.003 | 9.72792 | −5.08636 | 0.396 | 8.72893 | −3.22738 | 0.943 |
| 8.5973 | −4.95953 | −0.003 | 9.38791 | −4.56575 | 0.396 | 8.45536 | −2.68827 | 0.943 |
| 8.24155 | −4.47033 | −0.003 | 9.017 | −4.00965 | 0.396 | 8.15917 | −2.10979 | 0.943 |
| 7.84597 | −3.96139 | −0.003 | 8.61454 | −3.42192 | 0.396 | 7.83961 | −1.49538 | 0.943 |
| 7.40564 | −3.44141 | −0.003 | 8.17896 | −2.80772 | 0.396 | 7.49545 | −0.84925 | 0.943 |
| 6.91532 | −2.92112 | −0.003 | 7.70778 | −2.17357 | 0.396 | 7.12477 | −0.1765 | 0.943 |
| 6.36993 | −2.41372 | −0.003 | 7.19905 | −1.52639 | 0.396 | 6.72505 | 0.51688 | 0.943 |
| 5.76548 | −1.93491 | −0.003 | 6.65021 | −0.87453 | 0.396 | 6.29314 | 1.22388 | 0.943 |
| 5.10051 | −1.50242 | −0.003 | 6.0575 | −0.22869 | 0.396 | 5.82537 | 1.9363 | 0.943 |
| 4.3777 | −1.13429 | −0.003 | 5.41646 | 0.39787 | 0.396 | 5.31677 | 2.64401 | 0.943 |
| 3.60506 | −0.846 | −0.003 | 4.72344 | 0.98968 | 0.396 | 4.76308 | 3.33573 | 0.943 |
| 2.79546 | −0.64705 | −0.003 | 3.9765 | 1.52899 | 0.396 | 4.15969 | 3.99772 | 0.943 |
| 1.96434 | −0.53895 | −0.003 | 3.17535 | 1.99372 | 0.396 | 3.50245 | 4.61327 | 0.943 |
| 1.12673 | −0.5155 | −0.003 | 2.32439 | 2.35886 | 0.396 | 2.79009 | 5.16377 | 0.943 |
| 0.2951 | −0.56549 | −0.003 | 1.43659 | 2.60269 | 0.396 | 2.02574 | 5.62961 | 0.943 |
| −0.52132 | −0.67507 | −0.003 | 0.53332 | 2.71563 | 0.396 | 1.21861 | 5.99271 | 0.943 |
| −1.31613 | −0.83038 | −0.003 | −0.3615 | 2.70116 | 0.396 | 0.38484 | 6.24148 | 0.943 |
| −2.08502 | −1.01841 | −0.003 | −1.22708 | 2.57509 | 0.396 | −0.45544 | 6.37255 | 0.943 |
| −2.82501 | −1.22764 | −0.003 | −2.0492 | 2.35994 | 0.396 | −1.28165 | 6.37068 | 0.943 |
| −3.53382 | −1.44837 | −0.003 | −2.82052 | 2.08043 | 0.396 | −2.05823 | 6.18864 | 0.943 |
| −4.20959 | −1.67244 | −0.003 | −3.5387 | 1.75918 | 0.396 | −2.76269 | 5.8906 | 0.943 |
| −4.8508 | −1.89255 | −0.003 | −4.20412 | 1.41499 | 0.396 | −3.41073 | 5.55807 | 0.943 |
| −5.45659 | −2.10099 | −0.003 | −4.81773 | 1.06186 | 0.396 | −3.99612 | 5.19599 | 0.943 |
| −6.02485 | −2.29493 | −0.003 | −5.38085 | 0.7109 | 0.396 | −4.49774 | 4.79034 | 0.943 |
| −6.55493 | −2.46818 | −0.003 | −5.89514 | 0.37134 | 0.396 | −4.92417 | 4.36943 | 0.943 |
| −7.04553 | −2.61733 | −0.003 | −6.3619 | 0.05005 | 0.396 | −5.28234 | 3.95083 | 0.943 |
| −7.49554 | −2.73907 | −0.003 | −6.78212 | −0.24797 | 0.396 | −5.58214 | 3.54959 | 0.943 |
| −7.90382 | −2.83054 | −0.003 | −7.15699 | −0.51863 | 0.396 | −5.83453 | 3.1776 | 0.943 |
| −8.2691 | −2.88918 | −0.003 | −7.48879 | −0.75748 | 0.396 | −6.05194 | 2.84484 | 0.943 |
| −8.58965 | −2.91272 | −0.003 | −7.78245 | −0.95729 | 0.396 | −6.24315 | 2.55728 | 0.943 |
| −8.86271 | −2.89961 | −0.003 | −8.03905 | −1.11674 | 0.396 | −6.41557 | 2.3195 | 0.943 |
| −9.084 | −2.85139 | −0.003 | −8.25861 | −1.23688 | 0.396 | −6.58611 | 2.14592 | 0.943 |
| −9.24928 | −2.77657 | −0.003 | −8.44679 | −1.30605 | 0.396 | −6.75998 | 2.05781 | 0.943 |
| −9.35977 | −2.69237 | −0.003 | −8.5995 | −1.32171 | 0.396 | −6.90861 | 2.04418 | 0.943 |
| −9.42596 | −2.6178 | −0.003 | −8.70756 | −1.30018 | 0.396 | −7.01279 | 2.06913 | 0.943 |
| −9.46189 | −2.56411 | −0.003 | −8.7717 | −1.26882 | 0.396 | −7.07499 | 2.09992 | 0.943 |
| −9.48341 | −2.52522 | −0.003 | −8.81117 | −1.23959 | 0.396 | −7.11422 | 2.12715 | 0.943 |
| −9.48276 | −2.46823 | 0.022 | −8.46569 | −1.15301 | 0.495 | −7.15245 | 2.26476 | 0.968 |
| −9.50592 | −2.41988 | 0.022 | −8.50754 | −1.11302 | 0.495 | −7.19218 | 2.29961 | 0.968 |

TABLE 1-continued

| X | Y | Z' | X | Y | Z' | X | Y | Z' |
|---|---|---|---|---|---|---|---|---|
| −9.53043 | −2.34592 | 0.022 | −8.55449 | −1.04321 | 0.495 | −7.24442 | 2.35591 | 0.968 |
| −9.54561 | −2.22662 | 0.022 | −8.59606 | −0.92019 | 0.495 | −7.31146 | 2.45369 | 0.968 |
| −9.5271 | −2.06009 | 0.022 | −8.6065 | −0.73957 | 0.495 | −7.37564 | 2.60587 | 0.968 |
| −9.45531 | −1.85337 | 0.022 | −8.57154 | −0.50589 | 0.495 | −7.40763 | 2.8192 | 0.968 |
| −9.32431 | −1.61365 | 0.022 | −8.48817 | −0.22295 | 0.495 | −7.38623 | 3.08763 | 0.968 |
| −9.13447 | −1.34404 | 0.022 | −8.35807 | 0.10845 | 0.495 | −7.30026 | 3.40109 | 0.968 |
| −8.88614 | −1.04635 | 0.022 | −8.17511 | 0.48494 | 0.495 | −7.15081 | 3.7528 | 0.968 |
| −8.57906 | −0.72258 | 0.022 | −7.93538 | 0.90287 | 0.495 | −6.93638 | 4.13687 | 0.968 |
| −8.21235 | −0.37586 | 0.022 | −7.63852 | 1.35982 | 0.495 | −6.65403 | 4.54644 | 0.968 |
| −7.7849 | −0.01055 | 0.022 | −7.28328 | 1.85217 | 0.495 | −6.30211 | 4.97466 | 0.968 |
| −7.2958 | 0.36802 | 0.022 | −6.86565 | 2.37327 | 0.495 | −5.8809 | 5.41543 | 0.968 |
| −6.74499 | 0.75411 | 0.022 | −6.38056 | 2.91381 | 0.495 | −5.39059 | 5.86179 | 0.968 |
| −6.13326 | 1.14178 | 0.022 | −5.82582 | 3.46494 | 0.495 | −4.83197 | 6.30631 | 0.968 |
| −5.46237 | 1.52521 | 0.022 | −5.1997 | 4.0164 | 0.495 | −4.21008 | 6.74617 | 0.968 |
| −4.73482 | 1.89845 | 0.022 | −4.49875 | 4.55324 | 0.495 | −3.52314 | 7.16784 | 0.968 |
| −3.95344 | 2.25462 | 0.022 | −3.72186 | 5.05933 | 0.495 | −2.75544 | 7.52444 | 0.968 |
| −3.12116 | 2.58496 | 0.022 | −2.86819 | 5.51326 | 0.495 | −1.90459 | 7.75936 | 0.968 |
| −2.2411 | 2.87792 | 0.022 | −1.93961 | 5.8884 | 0.495 | −0.99437 | 7.84575 | 0.968 |
| −1.31719 | 3.11853 | 0.022 | −0.94263 | 6.15053 | 0.495 | −0.05678 | 7.76437 | 0.968 |
| −0.35536 | 3.2889 | 0.022 | 0.10562 | 6.26692 | 0.495 | 0.87377 | 7.51699 | 0.968 |
| 0.63497 | 3.36908 | 0.022 | 1.17672 | 6.20662 | 0.495 | 1.77107 | 7.12446 | 0.968 |
| 1.63946 | 3.34034 | 0.022 | 2.23277 | 5.95755 | 0.495 | 2.61821 | 6.61106 | 0.968 |
| 2.63878 | 3.18919 | 0.022 | 3.23841 | 5.5338 | 0.495 | 3.40641 | 6.0017 | 0.968 |
| 3.61092 | 2.91188 | 0.022 | 4.16872 | 4.96287 | 0.495 | 4.13386 | 5.32065 | 0.968 |
| 4.53504 | 2.51545 | 0.022 | 5.01359 | 4.28094 | 0.495 | 4.80292 | 4.58929 | 0.968 |
| 5.39848 | 2.0216 | 0.022 | 5.77439 | 3.52286 | 0.495 | 5.41705 | 3.82493 | 0.968 |
| 6.19627 | 1.45524 | 0.022 | 6.45984 | 2.71904 | 0.495 | 5.97994 | 3.0418 | 0.968 |
| 6.92833 | 0.83919 | 0.022 | 7.07869 | 1.89184 | 0.495 | 6.49678 | 2.25289 | 0.968 |
| 7.59575 | 0.19142 | 0.022 | 7.63804 | 1.05779 | 0.495 | 6.97132 | 1.46843 | 0.968 |
| 8.20483 | −0.46913 | 0.022 | 8.14683 | 0.23176 | 0.495 | 7.41381 | 0.70119 | 0.968 |
| 8.75973 | −1.12918 | 0.022 | 8.61175 | −0.57493 | 0.495 | 7.82873 | −0.04067 | 0.968 |
| 9.26436 | −1.77786 | 0.022 | 9.03694 | −1.35381 | 0.495 | 8.2128 | −0.75397 | 0.968 |
| 9.72212 | −2.4063 | 0.022 | 9.42605 | −2.09766 | 0.495 | 8.56344 | −1.43545 | 0.968 |
| 10.13522 | −3.00767 | 0.022 | 9.78284 | −2.8 | 0.495 | 8.87997 | −2.08124 | 0.968 |
| 10.50615 | −3.57603 | 0.022 | 10.10911 | −3.45617 | 0.495 | 9.16378 | −2.68707 | 0.968 |
| 10.83619 | −4.10705 | 0.022 | 10.40584 | −4.06255 | 0.495 | 9.41676 | −3.24907 | 0.968 |
| 11.12632 | −4.59745 | 0.022 | 10.67389 | −4.6163 | 0.495 | 9.64305 | −3.76313 | 0.968 |
| 11.37759 | −5.04465 | 0.022 | 10.91405 | −5.11539 | 0.495 | 9.84634 | −4.22612 | 0.968 |
| 11.59024 | −5.44734 | 0.022 | 11.12691 | −5.55863 | 0.495 | 10.02644 | −4.6373 | 0.968 |
| 11.72558 | −5.82134 | 0.022 | 11.31291 | −5.9457 | 0.495 | 10.18461 | −4.99604 | 0.968 |
| 11.75615 | −6.16075 | 0.022 | 11.47242 | −6.2773 | 0.495 | 10.32311 | −5.30209 | 0.968 |
| 11.72105 | −6.44383 | 0.022 | 11.60596 | −6.55483 | 0.495 | 10.42861 | −5.56272 | 0.968 |
| 11.65096 | −6.66501 | 0.022 | 11.71644 | −6.77967 | 0.495 | 10.53037 | −5.76755 | 0.968 |
| 11.57084 | −6.82832 | 0.022 | 11.79756 | −6.95855 | 0.495 | 10.58137 | −5.93945 | 0.968 |
| 11.49246 | −6.9393 | 0.022 | 11.81868 | −7.10373 | 0.495 | 10.5581 | −6.07135 | 0.968 |
| 11.42465 | −7.00563 | 0.022 | 11.78568 | −7.20068 | 0.495 | 10.50701 | −6.14966 | 0.968 |
| 11.37618 | −7.04073 | 0.022 | 11.74242 | −7.24867 | 0.495 | 10.46277 | −6.18868 | 0.968 |
| 11.33709 | −7.06491 | 0.022 | 11.70096 | −7.27596 | 0.495 | 10.42395 | −6.21205 | 0.968 |
| 11.30325 | −7.08243 | 0.022 | 11.6611 | −7.29232 | 0.495 | 10.38627 | −6.2279 | 0.968 |
| 11.25751 | −7.10161 | 0.022 | 11.60598 | −7.3027 | 0.495 | 10.33451 | −6.24028 | 0.968 |
| 11.18172 | −7.1225 | 0.022 | 11.51802 | −7.2898 | 0.495 | 10.25019 | −6.23795 | 0.968 |
| 11.06969 | −7.13391 | 0.022 | 11.4138 | −7.21663 | 0.495 | 10.14056 | −6.18715 | 0.968 |
| 10.91895 | −7.13636 | 0.022 | 11.3149 | −7.07775 | 0.495 | 10.03212 | −6.06711 | 0.968 |
| 10.72726 | −7.12094 | 0.022 | 11.20588 | −6.88959 | 0.495 | 9.92786 | −5.88906 | 0.968 |
| 10.50299 | −7.04613 | 0.022 | 11.06746 | −6.66086 | 0.495 | 9.80841 | −5.66529 | 0.968 |
| 10.25201 | −6.91656 | 0.022 | 10.90585 | −6.38535 | 0.495 | 9.66798 | −5.39673 | 0.968 |
| 9.99733 | −6.70727 | 0.022 | 10.71825 | −6.06323 | 0.495 | 9.50315 | −5.08379 | 0.968 |
| 9.76231 | −6.41194 | 0.022 | 10.50383 | −5.69418 | 0.495 | 9.31339 | −4.72603 | 0.968 |
| 9.52631 | −6.0583 | 0.022 | 10.26225 | −5.2785 | 0.495 | 9.10021 | −4.32274 | 0.968 |
| 9.26213 | −5.66685 | 0.022 | 9.99372 | −4.81688 | 0.495 | 8.86516 | −3.87385 | 0.968 |
| 8.96713 | −5.24082 | 0.022 | 9.69814 | −4.31089 | 0.495 | 8.60828 | −3.38075 | 0.968 |
| 8.639 | −4.78394 | 0.022 | 9.37481 | −3.76309 | 0.495 | 8.3295 | −2.84545 | 0.968 |
| 8.2744 | −4.30152 | 0.022 | 9.02259 | −3.17696 | 0.495 | 8.029 | −2.27042 | 0.968 |
| 7.86951 | −3.80022 | 0.022 | 8.64046 | −2.55649 | 0.495 | 7.70675 | −1.65872 | 0.968 |
| 7.4202 | −3.28826 | 0.022 | 8.22658 | −1.90684 | 0.495 | 7.3615 | −1.01455 | 0.968 |
| 6.92167 | −2.77614 | 0.022 | 7.77746 | −1.23491 | 0.495 | 6.99182 | −0.34271 | 0.968 |
| 6.36522 | −2.28123 | 0.022 | 7.28984 | −0.54831 | 0.495 | 6.59563 | 0.35117 | 0.968 |
| 5.75293 | −1.81289 | 0.022 | 6.76003 | 0.14394 | 0.495 | 6.1699 | 1.06029 | 0.968 |
| 5.08409 | −1.38688 | 0.022 | 6.18274 | 0.83017 | 0.495 | 5.71126 | 1.77694 | 0.968 |
| 4.36088 | −1.0201 | 0.022 | 5.55112 | 1.49495 | 0.495 | 5.21501 | 2.4916 | 0.968 |
| 3.59043 | −0.72672 | 0.022 | 4.85886 | 2.1194 | 0.495 | 4.67623 | 3.19314 | 0.968 |
| 2.78413 | −0.5158 | 0.022 | 4.10298 | 2.68235 | 0.495 | 4.08966 | 3.86811 | 0.968 |
| 1.95571 | −0.39042 | 0.022 | 3.28381 | 3.15847 | 0.495 | 3.45027 | 4.50005 | 0.968 |
| 1.11913 | −0.34755 | 0.022 | 2.40809 | 3.51965 | 0.495 | 2.75614 | 5.07102 | 0.968 |
| 0.28687 | −0.37952 | 0.022 | 1.49348 | 3.74452 | 0.495 | 2.00942 | 5.56193 | 0.968 |
| −0.53105 | −0.47512 | 0.022 | 0.56562 | 3.82373 | 0.495 | 1.21791 | 5.95459 | 0.968 |
| −1.32725 | −0.62178 | 0.022 | −0.34796 | 3.76426 | 0.495 | 0.39532 | 6.2337 | 0.968 |
| −2.0965 | −0.80727 | 0.022 | −1.22487 | 3.58606 | 0.495 | −0.43747 | 6.39894 | 0.968 |

TABLE 1-continued

| X | Y | Z' | X | Y | Z' | X | Y | Z' |
|---|---|---|---|---|---|---|---|---|
| −2.83536 | −1.01956 | 0.022 | −2.05078 | 3.31471 | 0.495 | −1.26228 | 6.40558 | 0.968 |
| −3.54227 | −1.24559 | 0.022 | −2.81852 | 2.97568 | 0.495 | −2.01744 | 6.15294 | 0.968 |
| −4.21554 | −1.47635 | 0.022 | −3.52606 | 2.59205 | 0.495 | −2.70313 | 5.8168 | 0.968 |
| −4.85395 | −1.70383 | 0.022 | −4.17395 | 2.18266 | 0.495 | −3.34701 | 5.47888 | 0.968 |
| −5.45667 | −1.92042 | 0.022 | −4.76306 | 1.76137 | 0.495 | −3.93409 | 5.12176 | 0.968 |
| −6.02182 | −2.12268 | 0.022 | −5.29649 | 1.3416 | 0.495 | −4.42989 | 4.71069 | 0.968 |
| −6.54877 | −2.3047 | 0.022 | −5.77682 | 0.93326 | 0.495 | −4.85019 | 4.28507 | 0.968 |
| −7.03627 | −2.46316 | 0.022 | −6.20681 | 0.54448 | 0.495 | −5.20213 | 3.8624 | 0.968 |
| −7.48328 | −2.59497 | 0.022 | −6.58925 | 0.18188 | 0.495 | −5.49749 | 3.45892 | 0.968 |
| −7.88881 | −2.69743 | 0.022 | −6.92691 | −0.14935 | 0.495 | −5.75171 | 3.08908 | 0.968 |
| −8.25184 | −2.76812 | 0.022 | −7.2239 | −0.44383 | 0.495 | −5.97483 | 2.76092 | 0.968 |
| −8.57104 | −2.80489 | 0.022 | −7.48632 | −0.69515 | 0.495 | −6.18411 | 2.48696 | 0.968 |
| −8.84433 | −2.80585 | 0.022 | −7.71737 | −0.9004 | 0.495 | −6.40158 | 2.29026 | 0.968 |
| −9.06812 | −2.77147 | 0.022 | −7.91647 | −1.06138 | 0.495 | −6.61498 | 2.17418 | 0.968 |
| −9.23803 | −2.70802 | 0.022 | −8.09197 | −1.16752 | 0.495 | −6.80699 | 2.14252 | 0.968 |
| −9.35339 | −2.6307 | 0.022 | −8.24265 | −1.21178 | 0.495 | −6.95463 | 2.16267 | 0.968 |
| −9.42273 | −2.5591 | 0.022 | −8.35522 | −1.20609 | 0.495 | −7.0543 | 2.20143 | 0.968 |
| −9.4603 | −2.50657 | 0.022 | −8.4236 | −1.18046 | 0.495 | −7.11408 | 2.23647 | 0.968 |
| −9.48276 | −2.46823 | 0.022 | −8.46569 | −1.15301 | 0.495 | −7.15245 | 2.26476 | 0.968 |
| −9.48163 | −2.40588 | 0.047 | −8.13514 | −0.76525 | 0.595 | −7.20471 | 2.38071 | 0.993 |
| −9.50604 | −2.35846 | 0.047 | −8.17718 | −0.72636 | 0.595 | −7.24507 | 2.41594 | 0.993 |
| −9.53212 | −2.28546 | 0.047 | −8.22394 | −0.65752 | 0.595 | −7.29977 | 2.47132 | 0.993 |
| −9.54926 | −2.16706 | 0.047 | −8.26473 | −0.53571 | 0.595 | −7.37461 | 2.56532 | 0.993 |
| −9.53493 | −2.00099 | 0.047 | −8.27491 | −0.35703 | 0.595 | −7.45814 | 2.71039 | 0.993 |
| −9.46895 | −1.79353 | 0.047 | −8.24278 | −0.12551 | 0.595 | −7.52775 | 2.91765 | 0.993 |
| −9.3445 | −1.55193 | 0.047 | −8.16596 | 0.15599 | 0.595 | −7.55298 | 3.18941 | 0.993 |
| −9.16194 | −1.2794 | 0.047 | −8.04563 | 0.487 | 0.595 | −7.50522 | 3.51537 | 0.993 |
| −8.92158 | −0.97778 | 0.047 | −7.87559 | 0.86456 | 0.595 | −7.37724 | 3.88094 | 0.993 |
| −8.62319 | −0.6491 | 0.047 | −7.65119 | 1.28507 | 0.595 | −7.16966 | 4.27548 | 0.993 |
| −8.26588 | −0.29642 | 0.047 | −7.37109 | 1.74562 | 0.595 | −6.88265 | 4.69003 | 0.993 |
| −7.84849 | 0.076 | 0.047 | −7.03355 | 2.2424 | 0.595 | −6.51395 | 5.1139 | 0.993 |
| −7.37002 | 0.46284 | 0.047 | −6.6342 | 2.76865 | 0.595 | −6.06612 | 5.53966 | 0.993 |
| −6.83027 | 0.85838 | 0.047 | −6.16756 | 3.31496 | 0.595 | −5.54588 | 5.96508 | 0.993 |
| −6.2297 | 1.2564 | 0.047 | −5.63079 | 3.87199 | 0.595 | −4.95882 | 6.38806 | 0.993 |
| −5.56968 | 1.65051 | 0.047 | −5.0218 | 4.4291 | 0.595 | −4.31431 | 6.81308 | 0.993 |
| −4.85234 | 2.03412 | 0.047 | −4.33716 | 4.97143 | 0.595 | −3.61563 | 7.23648 | 0.993 |
| −4.08014 | 2.3995 | 0.047 | −3.57579 | 5.48291 | 0.595 | −2.84469 | 7.61293 | 0.993 |
| −3.2557 | 2.73692 | 0.047 | −2.73746 | 5.94334 | 0.595 | −1.98443 | 7.85851 | 0.993 |
| −2.382 | 3.03373 | 0.047 | −1.82348 | 6.32569 | 0.595 | −1.06198 | 7.94717 | 0.993 |
| −1.46307 | 3.27387 | 0.047 | −0.84164 | 6.60126 | 0.595 | −0.11276 | 7.85316 | 0.993 |
| −0.50532 | 3.43823 | 0.047 | 0.19326 | 6.73369 | 0.595 | 0.82347 | 7.5777 | 0.993 |
| 0.48077 | 3.50623 | 0.047 | 1.25373 | 6.6926 | 0.595 | 1.71794 | 7.14722 | 0.993 |
| 1.4794 | 3.46005 | 0.047 | 2.30269 | 6.46505 | 0.595 | 2.55823 | 6.59778 | 0.993 |
| 2.47016 | 3.28877 | 0.047 | 3.30293 | 6.05893 | 0.595 | 3.33894 | 5.95737 | 0.993 |
| 3.43046 | 2.99006 | 0.047 | 4.22775 | 5.50158 | 0.595 | 4.05956 | 5.2497 | 0.993 |
| 4.33961 | 2.57273 | 0.047 | 5.0655 | 4.82942 | 0.595 | 4.72417 | 4.4963 | 0.993 |
| 5.18535 | 2.05899 | 0.047 | 5.81662 | 4.078 | 0.595 | 5.33698 | 3.71394 | 0.993 |
| 5.96332 | 1.47409 | 0.047 | 6.48992 | 3.27877 | 0.595 | 5.90111 | 2.91567 | 0.993 |
| 6.67436 | 0.84131 | 0.047 | 7.09448 | 2.4548 | 0.595 | 6.42141 | 2.11375 | 0.993 |
| 7.32052 | 0.17903 | 0.047 | 7.63755 | 1.62292 | 0.595 | 6.89921 | 1.31677 | 0.993 |
| 7.90895 | −0.49382 | 0.047 | 8.12846 | 0.79827 | 0.595 | 7.35262 | 0.54201 | 0.993 |
| 8.44394 | −1.16441 | 0.047 | 8.57507 | −0.00726 | 0.595 | 7.78915 | −0.20074 | 0.993 |
| 8.92979 | −1.822 | 0.047 | 8.98214 | −0.78502 | 0.595 | 8.20162 | −0.91072 | 0.993 |
| 9.37076 | −2.45743 | 0.047 | 9.35363 | −1.52774 | 0.595 | 8.58181 | −1.58809 | 0.993 |
| 9.76954 | −3.06389 | 0.047 | 9.694 | −2.22878 | 0.595 | 8.9241 | −2.23165 | 0.993 |
| 10.12854 | −3.63571 | 0.047 | 10.00545 | −2.88339 | 0.595 | 9.22667 | −2.83848 | 0.993 |
| 10.44958 | −4.16845 | 0.047 | 10.28907 | −3.488 | 0.595 | 9.49024 | −3.40481 | 0.993 |
| 10.73388 | −4.65884 | 0.047 | 10.54581 | −4.0398 | 0.595 | 9.71974 | −3.92576 | 0.993 |
| 10.9825 | −5.10449 | 0.047 | 10.77647 | −4.53679 | 0.595 | 9.9252 | −4.39528 | 0.993 |
| 11.19652 | −5.50379 | 0.047 | 10.9816 | −4.97784 | 0.595 | 10.1075 | −4.81213 | 0.993 |
| 11.35815 | −5.86494 | 0.047 | 11.16147 | −5.36271 | 0.595 | 10.26538 | −5.17679 | 0.993 |
| 11.45093 | −6.19102 | 0.047 | 11.31618 | −5.6922 | 0.595 | 10.39894 | −5.48998 | 0.993 |
| 11.49503 | −6.47135 | 0.047 | 11.44589 | −5.96789 | 0.595 | 10.51859 | −5.74864 | 0.993 |
| 11.50782 | −6.70181 | 0.047 | 11.55381 | −6.19098 | 0.595 | 10.58452 | −5.97087 | 0.993 |
| 11.50466 | −6.88275 | 0.047 | 11.63168 | −6.36899 | 0.595 | 10.57739 | −6.15247 | 0.993 |
| 11.47332 | −7.01423 | 0.047 | 11.64689 | −6.51332 | 0.595 | 10.53105 | −6.28006 | 0.993 |
| 11.41996 | −7.09206 | 0.047 | 11.61034 | −6.60781 | 0.595 | 10.47197 | −6.35416 | 0.993 |
| 11.37329 | −7.12902 | 0.047 | 11.5666 | −6.65442 | 0.595 | 10.42535 | −6.39159 | 0.993 |
| 11.33477 | −7.15367 | 0.047 | 11.52535 | −6.68105 | 0.595 | 10.38589 | −6.4151 | 0.993 |
| 11.30059 | −7.17066 | 0.047 | 11.48502 | −6.69743 | 0.595 | 10.34847 | −6.43239 | 0.993 |
| 11.25366 | −7.18701 | 0.047 | 11.42934 | −6.70789 | 0.595 | 10.29755 | −6.44933 | 0.993 |
| 11.17555 | −7.19713 | 0.047 | 11.34044 | −6.6951 | 0.595 | 10.21345 | −6.46211 | 0.993 |
| 11.06379 | −7.18165 | 0.047 | 11.23535 | −6.62088 | 0.595 | 10.09243 | −6.44795 | 0.993 |
| 10.91889 | −7.13895 | 0.047 | 11.13717 | −6.47936 | 0.595 | 9.94946 | −6.3694 | 0.993 |
| 10.74659 | −7.05274 | 0.047 | 11.03016 | −6.2875 | 0.595 | 9.8176 | −6.20844 | 0.993 |
| 10.55658 | −6.9113 | 0.047 | 10.89508 | −6.05362 | 0.595 | 9.6926 | −5.98525 | 0.993 |
| 10.34062 | −6.72842 | 0.047 | 10.73823 | −5.77163 | 0.595 | 9.5473 | −5.71638 | 0.993 |
| 10.11626 | −6.48604 | 0.047 | 10.55634 | −5.44187 | 0.595 | 9.38024 | −5.40124 | 0.993 |

TABLE 1-continued

| X | Y | Z' | X | Y | Z' | X | Y | Z' |
|---|---|---|---|---|---|---|---|---|
| 9.89067 | −6.18255 | 0.047 | 10.34912 | −5.06374 | 0.595 | 9.18743 | −5.04123 | 0.993 |
| 9.64891 | −5.83183 | 0.047 | 10.11674 | −4.63723 | 0.595 | 8.97038 | −4.63562 | 0.993 |
| 9.37668 | −5.44484 | 0.047 | 9.85955 | −4.16297 | 0.595 | 8.73105 | −4.18415 | 0.993 |
| 9.0716 | −5.02473 | 0.047 | 9.57733 | −3.64256 | 0.595 | 8.47031 | −3.68776 | 0.993 |
| 8.73161 | −4.57525 | 0.047 | 9.26928 | −3.07859 | 0.595 | 8.18861 | −3.14824 | 0.993 |
| 8.35377 | −4.10165 | 0.047 | 8.93412 | −2.47452 | 0.595 | 7.88629 | −2.56797 | 0.993 |
| 7.93485 | −3.61039 | 0.047 | 8.5704 | −1.83448 | 0.595 | 7.56332 | −1.95004 | 0.993 |
| 7.47147 | −3.10935 | 0.047 | 8.17627 | −1.1635 | 0.595 | 7.21923 | −1.29826 | 0.993 |
| 6.95959 | −2.60863 | 0.047 | 7.74785 | −0.46844 | 0.595 | 6.85299 | −0.61717 | 0.993 |
| 6.39228 | −2.12401 | 0.047 | 7.28051 | 0.24246 | 0.595 | 6.46223 | 0.08751 | 0.993 |
| 5.77174 | −1.66417 | 0.047 | 6.76964 | 0.9598 | 0.595 | 6.04445 | 0.80944 | 0.993 |
| 5.09753 | −1.24382 | 0.047 | 6.20938 | 1.67172 | 0.595 | 5.59602 | 1.54098 | 0.993 |
| 4.3718 | −0.87858 | 0.047 | 5.59187 | 2.36229 | 0.595 | 5.1127 | 2.27327 | 0.993 |
| 3.60105 | −0.58159 | 0.047 | 4.90926 | 3.0112 | 0.595 | 4.58951 | 2.99577 | 0.993 |
| 2.79551 | −0.36166 | 0.047 | 4.15749 | 3.59549 | 0.595 | 4.02046 | 3.69535 | 0.993 |
| 1.96757 | −0.22304 | 0.047 | 3.33656 | 4.08771 | 0.595 | 3.39901 | 4.35541 | 0.993 |
| 1.1303 | −0.16499 | 0.047 | 2.4547 | 4.45938 | 0.595 | 2.72251 | 4.95864 | 0.993 |
| 0.29602 | −0.18264 | 0.047 | 1.53095 | 4.68748 | 0.595 | 1.99084 | 5.48475 | 0.993 |
| −0.5247 | −0.26721 | 0.047 | 0.59328 | 4.76378 | 0.595 | 1.20972 | 5.91345 | 0.993 |
| −1.32361 | −0.40756 | 0.047 | −0.32915 | 4.69623 | 0.595 | 0.39278 | 6.22964 | 0.993 |
| −2.09481 | −0.59141 | 0.047 | −1.21264 | 4.50479 | 0.595 | −0.43916 | 6.43204 | 0.993 |
| −2.83459 | −0.80582 | 0.047 | −2.04193 | 4.21566 | 0.595 | −1.27096 | 6.42814 | 0.993 |
| −3.5414 | −1.03676 | 0.047 | −2.80877 | 3.85396 | 0.595 | −1.99889 | 6.08904 | 0.993 |
| −4.21378 | −1.27426 | 0.047 | −3.50978 | 3.44201 | 0.595 | −2.67668 | 5.72346 | 0.993 |
| −4.85074 | −1.50953 | 0.047 | −4.14474 | 2.99896 | 0.595 | −3.32231 | 5.37574 | 0.993 |
| −5.45157 | −1.7348 | 0.047 | −4.7152 | 2.54081 | 0.595 | −3.91242 | 5.01243 | 0.993 |
| −6.01466 | −1.94603 | 0.047 | −5.22366 | 2.08069 | 0.595 | −4.39833 | 4.58147 | 0.993 |
| −6.53938 | −2.1375 | 0.047 | −5.674 | 1.63031 | 0.595 | −4.80447 | 4.13545 | 0.993 |
| −7.0246 | −2.30585 | 0.047 | −6.07068 | 1.1995 | 0.595 | −5.14117 | 3.69468 | 0.993 |
| −7.46934 | −2.4481 | 0.047 | −6.41821 | 0.79616 | 0.595 | −5.42958 | 3.28104 | 0.993 |
| −7.87273 | −2.56166 | 0.047 | −6.72133 | 0.42676 | 0.595 | −5.68485 | 2.90732 | 0.993 |
| −8.23399 | −2.64413 | 0.047 | −6.98578 | 0.09723 | 0.595 | −5.91979 | 2.58337 | 0.993 |
| −8.55212 | −2.69344 | 0.047 | −7.21886 | −0.18634 | 0.595 | −6.16955 | 2.34152 | 0.993 |
| −8.82557 | −2.70746 | 0.047 | −7.42487 | −0.42095 | 0.595 | −6.43581 | 2.21286 | 0.993 |
| −9.05139 | −2.68585 | 0.047 | −7.60309 | −0.60841 | 0.595 | −6.67874 | 2.18121 | 0.993 |
| −9.22533 | −2.63326 | 0.047 | −7.76337 | −0.73972 | 0.595 | −6.87306 | 2.20865 | 0.993 |
| −9.34544 | −2.56301 | 0.047 | −7.90753 | −0.80599 | 0.595 | −7.01398 | 2.2608 | 0.993 |
| −9.41828 | −2.4947 | 0.047 | −8.02118 | −0.81308 | 0.595 | −7.10888 | 2.31206 | 0.993 |
| −9.4579 | −2.44355 | 0.047 | −8.09175 | −0.7916 | 0.595 | −7.16675 | 2.3512 | 0.993 |
| −9.48163 | −2.40588 | 0.047 | −8.13514 | −0.76525 | 0.595 | −7.20471 | 2.38071 | 0.993 |
| −9.47771 | −2.33927 | 0.072 | −7.82446 | −0.12691 | 0.694 | −7.21994 | 2.34588 | 1.043 |
| −9.50383 | −2.29275 | 0.072 | −7.86584 | −0.08896 | 0.694 | −7.26092 | 2.38204 | 1.043 |
| −9.53222 | −2.22059 | 0.072 | −7.9113 | −0.02119 | 0.694 | −7.3159 | 2.43937 | 1.043 |
| −9.55256 | −2.10264 | 0.072 | −7.95078 | 0.09842 | 0.694 | −7.38945 | 2.53747 | 1.043 |
| −9.54264 | −1.93618 | 0.072 | −7.96092 | 0.27362 | 0.694 | −7.46759 | 2.68937 | 1.043 |
| −9.48213 | −1.72697 | 0.072 | −7.92898 | 0.50057 | 0.694 | −7.52616 | 2.90464 | 1.043 |
| −9.36356 | −1.48231 | 0.072 | −7.85507 | 0.77698 | 0.694 | −7.53576 | 3.18298 | 1.043 |
| −9.18729 | −1.20551 | 0.072 | −7.74065 | 1.10283 | 0.694 | −7.47085 | 3.51282 | 1.043 |
| −8.95363 | −0.89849 | 0.072 | −7.57877 | 1.4752 | 0.694 | −7.32629 | 3.88067 | 1.043 |
| −8.66232 | −0.56328 | 0.072 | −7.36415 | 1.89037 | 0.694 | −7.10333 | 4.27722 | 1.043 |
| −8.31246 | −0.20293 | 0.072 | −7.09516 | 2.34536 | 0.694 | −6.80139 | 4.6938 | 1.043 |
| −7.90282 | 0.17833 | 0.072 | −6.7699 | 2.83632 | 0.694 | −6.41852 | 5.12045 | 1.043 |
| −7.43226 | 0.57514 | 0.072 | −6.38355 | 3.35627 | 0.694 | −5.95812 | 5.55129 | 1.043 |
| −6.90038 | 0.98164 | 0.072 | −5.92996 | 3.89532 | 0.694 | −5.4258 | 5.98361 | 1.043 |
| −6.30734 | 1.39128 | 0.072 | −5.40536 | 4.44319 | 0.694 | −4.82642 | 6.41478 | 1.043 |
| −5.65412 | 1.79715 | 0.072 | −4.80694 | 4.98807 | 0.694 | −4.1676 | 6.84673 | 1.043 |
| −4.94248 | 2.19192 | 0.072 | −4.13094 | 5.51389 | 0.694 | −3.44817 | 7.26789 | 1.043 |
| −4.17452 | 2.5669 | 0.072 | −3.37612 | 6.00292 | 0.694 | −2.64737 | 7.62165 | 1.043 |
| −3.35251 | 2.91112 | 0.072 | −2.54272 | 6.43304 | 0.694 | −1.76205 | 7.84435 | 1.043 |
| −2.47932 | 3.21055 | 0.072 | −1.6354 | 6.78018 | 0.694 | −0.81839 | 7.9053 | 1.043 |
| −1.55919 | 3.4476 | 0.072 | −0.66336 | 7.01477 | 0.694 | 0.14633 | 7.77603 | 1.043 |
| −0.59933 | 3.60161 | 0.072 | 0.35562 | 7.10603 | 0.694 | 1.08739 | 7.45029 | 1.043 |
| 0.38824 | 3.65139 | 0.072 | 1.39337 | 7.02879 | 0.694 | 1.97087 | 6.95479 | 1.043 |
| 1.3858 | 3.58017 | 0.072 | 2.41422 | 6.77267 | 0.694 | 2.78038 | 6.32689 | 1.043 |
| 2.37149 | 3.37971 | 0.072 | 3.38341 | 6.34699 | 0.694 | 3.51917 | 5.60863 | 1.043 |
| 3.32207 | 3.05017 | 0.072 | 4.27673 | 5.77866 | 0.694 | 4.19599 | 4.83139 | 1.043 |
| 4.21779 | 2.60384 | 0.072 | 5.0846 | 5.10298 | 0.694 | 4.82108 | 4.01885 | 1.043 |
| 5.04694 | 2.06302 | 0.072 | 5.80764 | 4.35294 | 0.694 | 5.40167 | 3.18742 | 1.043 |
| 5.80579 | 1.45289 | 0.072 | 6.4549 | 3.55853 | 0.694 | 5.94174 | 2.34881 | 1.043 |
| 6.4961 | 0.79701 | 0.072 | 7.03536 | 2.74167 | 0.694 | 6.44423 | 1.51277 | 1.043 |
| 7.12194 | 0.115 | 0.072 | 7.55638 | 1.91859 | 0.694 | 6.91581 | 0.69013 | 1.043 |
| 7.69074 | −0.57499 | 0.072 | 8.02683 | 1.10357 | 0.694 | 7.38779 | −0.09493 | 1.043 |
| 8.20692 | −1.26059 | 0.072 | 8.45444 | 0.30807 | 0.694 | 7.86618 | −0.83249 | 1.043 |
| 8.6753 | −1.93113 | 0.072 | 8.84406 | −0.45948 | 0.694 | 8.33329 | −1.52807 | 1.043 |
| 9.10093 | −2.57732 | 0.072 | 9.19959 | −1.19206 | 0.694 | 8.77196 | −2.18826 | 1.043 |
| 9.48679 | −3.19241 | 0.072 | 9.52497 | −1.88347 | 0.694 | 9.1706 | −2.81623 | 1.043 |
| 9.83487 | −3.77126 | 0.072 | 9.82233 | −2.52911 | 0.694 | 9.52008 | −3.4134 | 1.043 |
| 10.14753 | −4.30925 | 0.072 | 10.09343 | −3.12519 | 0.694 | 9.8177 | −3.97707 | 1.043 |

TABLE 1-continued

| X | Y | Z' | X | Y | Z' | X | Y | Z' |
|---|---|---|---|---|---|---|---|---|
| 10.42625 | −4.80309 | 0.072 | 10.33937 | −3.66893 | 0.694 | 10.06698 | −4.50176 | 1.043 |
| 10.6721 | −5.25052 | 0.072 | 10.56075 | −4.15846 | 0.694 | 10.27562 | −4.98131 | 1.043 |
| 10.88606 | −5.65004 | 0.072 | 10.75802 | −4.59271 | 0.694 | 10.45434 | −5.4098 | 1.043 |
| 11.06148 | −6.00488 | 0.072 | 10.93119 | −4.97157 | 0.694 | 10.60834 | −5.78489 | 1.043 |
| 11.19762 | −6.31552 | 0.072 | 11.08019 | −5.29591 | 0.694 | 10.7161 | −6.11519 | 1.043 |
| 11.30297 | −6.57913 | 0.072 | 11.20503 | −5.56733 | 0.694 | 10.7411 | −6.40493 | 1.043 |
| 11.38399 | −6.79536 | 0.072 | 11.30929 | −5.78684 | 0.694 | 10.69915 | −6.63772 | 1.043 |
| 11.44584 | −6.9655 | 0.072 | 11.3831 | −5.96248 | 0.694 | 10.614 | −6.80246 | 1.043 |
| 11.45719 | −7.10025 | 0.072 | 11.39249 | −6.10447 | 0.694 | 10.52435 | −6.90806 | 1.043 |
| 11.41869 | −7.18644 | 0.072 | 11.35316 | −6.1957 | 0.694 | 10.45057 | −6.97058 | 1.043 |
| 11.37445 | −7.22631 | 0.072 | 11.30932 | −6.2405 | 0.694 | 10.4 | −7.0047 | 1.043 |
| 11.33642 | −7.25174 | 0.072 | 11.26857 | −6.26614 | 0.694 | 10.3594 | −7.02811 | 1.043 |
| 11.30179 | −7.26835 | 0.072 | 11.22826 | −6.28216 | 0.694 | 10.32175 | −7.04711 | 1.043 |
| 11.25376 | −7.28225 | 0.072 | 11.17272 | −6.29236 | 0.694 | 10.27131 | −7.06878 | 1.043 |
| 11.17453 | −7.28374 | 0.072 | 11.08408 | −6.27991 | 0.694 | 10.18858 | −7.09578 | 1.043 |
| 11.06764 | −7.2455 | 0.072 | 10.97898 | −6.20648 | 0.694 | 10.06591 | −7.11792 | 1.043 |
| 10.94514 | −7.15554 | 0.072 | 10.88173 | −6.06503 | 0.694 | 9.89905 | −7.11512 | 1.043 |
| 10.80996 | −7.01659 | 0.072 | 10.77703 | −5.87275 | 0.694 | 9.69381 | −7.05866 | 1.043 |
| 10.65928 | −6.83194 | 0.072 | 10.64587 | −5.6377 | 0.694 | 9.47212 | −6.91962 | 1.043 |
| 10.48066 | −6.61021 | 0.072 | 10.49434 | −5.35406 | 0.694 | 9.27335 | −6.67828 | 1.043 |
| 10.27972 | −6.34553 | 0.072 | 10.31888 | −5.02228 | 0.694 | 9.09034 | −6.36261 | 1.043 |
| 10.0575 | −6.03668 | 0.072 | 10.1192 | −4.64176 | 0.694 | 8.88912 | −5.99647 | 1.043 |
| 9.81021 | −5.68663 | 0.072 | 9.8958 | −4.21235 | 0.694 | 8.66374 | −5.58334 | 1.043 |
| 9.53011 | −5.30169 | 0.072 | 9.64926 | −3.73452 | 0.694 | 8.41341 | −5.12444 | 1.043 |
| 9.21581 | −4.88443 | 0.072 | 9.3795 | −3.20982 | 0.694 | 8.14226 | −4.61898 | 1.043 |
| 8.86523 | −4.43874 | 0.072 | 9.0857 | −2.64074 | 0.694 | 7.85457 | −4.06678 | 1.043 |
| 8.47574 | −3.96981 | 0.072 | 8.76668 | −2.03065 | 0.694 | 7.55302 | −3.46921 | 1.043 |
| 8.04464 | −3.48387 | 0.072 | 8.42048 | −1.3838 | 0.694 | 7.23869 | −2.82892 | 1.043 |
| 7.56895 | −2.98867 | 0.072 | 8.04544 | −0.70498 | 0.694 | 6.91235 | −2.14922 | 1.043 |
| 7.0457 | −2.49341 | 0.072 | 7.63785 | −0.00072 | 0.694 | 6.57284 | −1.43466 | 1.043 |
| 6.47084 | −2.01059 | 0.072 | 7.19294 | 0.72104 | 0.694 | 6.21925 | −0.69005 | 1.043 |
| 5.84427 | −1.55093 | 0.072 | 6.70577 | 1.45108 | 0.694 | 5.84701 | 0.07776 | 1.043 |
| 5.16576 | −1.12824 | 0.072 | 6.17017 | 2.17791 | 0.694 | 5.45084 | 0.86106 | 1.043 |
| 4.43747 | −0.75698 | 0.072 | 5.57792 | 2.88616 | 0.694 | 5.02489 | 1.65114 | 1.043 |
| 3.66528 | −0.44973 | 0.072 | 4.92059 | 3.5562 | 0.694 | 4.56231 | 2.43777 | 1.043 |
| 2.85847 | −0.21535 | 0.072 | 4.19276 | 4.16501 | 0.694 | 4.05378 | 3.20748 | 1.043 |
| 2.02837 | −0.05934 | 0.072 | 3.39406 | 4.68662 | 0.694 | 3.48974 | 3.94369 | 1.043 |
| 1.18737 | 0.01692 | 0.072 | 2.53037 | 5.09114 | 0.694 | 2.86535 | 4.62918 | 1.043 |
| 0.34777 | 0.01576 | 0.072 | 1.61958 | 5.35508 | 0.694 | 2.17359 | 5.23861 | 1.043 |
| −0.47924 | −0.05626 | 0.072 | 0.68893 | 5.46883 | 0.694 | 1.41516 | 5.74424 | 1.043 |
| −1.28447 | −0.18924 | 0.072 | −0.2323 | 5.43799 | 0.694 | 0.60337 | 6.12382 | 1.043 |
| −2.06134 | −0.3703 | 0.072 | −1.11923 | 5.27979 | 0.694 | −0.23795 | 6.36748 | 1.043 |
| −2.80583 | −0.58551 | 0.072 | −1.95428 | 5.01754 | 0.694 | −1.08665 | 6.42931 | 1.043 |
| −3.51603 | −0.8208 | 0.072 | −2.72651 | 4.67455 | 0.694 | −1.86429 | 6.16446 | 1.043 |
| −4.19066 | −1.065 | 0.072 | −3.42997 | 4.27234 | 0.694 | −2.56609 | 5.80651 | 1.043 |
| −4.82899 | −1.30852 | 0.072 | −4.06243 | 3.83031 | 0.694 | −3.23271 | 5.46243 | 1.043 |
| −5.43047 | −1.54316 | 0.072 | −4.62438 | 3.36565 | 0.694 | −3.84669 | 5.10803 | 1.043 |
| −5.99375 | −1.76422 | 0.072 | −5.11832 | 2.89334 | 0.694 | −4.35838 | 4.6842 | 1.043 |
| −6.51827 | −1.96605 | 0.072 | −5.54897 | 2.42704 | 0.694 | −4.78761 | 4.24083 | 1.043 |
| −7.00299 | −2.14515 | 0.072 | −5.92222 | 1.97837 | 0.694 | −5.14332 | 3.79875 | 1.043 |
| −7.44705 | −2.29855 | 0.072 | −6.2442 | 1.55662 | 0.694 | −5.44268 | 3.37863 | 1.043 |
| −7.84971 | −2.42364 | 0.072 | −6.52091 | 1.16905 | 0.694 | −5.70356 | 2.99614 | 1.043 |
| −8.2104 | −2.51801 | 0.072 | −6.75998 | 0.82241 | 0.694 | −5.9378 | 2.66039 | 1.043 |
| −8.52841 | −2.57955 | 0.072 | −6.96932 | 0.5224 | 0.694 | −6.17459 | 2.39501 | 1.043 |
| −8.80265 | −2.60593 | 0.072 | −7.15451 | 0.27237 | 0.694 | −6.43106 | 2.23459 | 1.043 |
| −9.03069 | −2.59623 | 0.072 | −7.31526 | 0.07084 | 0.694 | −6.67435 | 2.1744 | 1.043 |
| −9.20855 | −2.55387 | 0.072 | −7.46056 | −0.07589 | 0.694 | −6.87486 | 2.18434 | 1.043 |
| −9.33346 | −2.49066 | 0.072 | −7.59709 | −0.15564 | 0.694 | −7.02236 | 2.22764 | 1.043 |
| −9.41024 | −2.42584 | 0.072 | −7.70956 | −0.1708 | 0.694 | −7.12119 | 2.27668 | 1.043 |
| −9.45235 | −2.3762 | 0.072 | −7.78073 | −0.15236 | 0.694 | −7.18101 | 2.31582 | 1.043 |
| −9.47771 | −2.33927 | 0.072 | −7.82446 | −0.12691 | 0.694 | −7.21994 | 2.34588 | 1.043 |
| −9.46877 | −2.26983 | 0.097 | −7.51393 | 0.71128 | 0.794 | −7.18628 | 2.24412 | 1.093 |
| −9.49705 | −2.22419 | 0.097 | −7.55384 | 0.7485 | 0.794 | −7.22711 | 2.28094 | 1.093 |
| −9.52853 | −2.15279 | 0.097 | −7.59758 | 0.81466 | 0.794 | −7.27978 | 2.34102 | 1.093 |
| −9.55339 | −2.03494 | 0.097 | −7.63484 | 0.93128 | 0.794 | −7.34456 | 2.44596 | 1.093 |
| −9.54637 | −1.86728 | 0.097 | −7.64271 | 1.10166 | 0.794 | −7.39976 | 2.60867 | 1.093 |
| −9.4887 | −1.65584 | 0.097 | −7.60935 | 1.32191 | 0.794 | −7.41244 | 2.83271 | 1.093 |
| −9.37342 | −1.40773 | 0.097 | −7.53555 | 1.59003 | 0.794 | −7.36557 | 3.1089 | 1.093 |
| −9.20077 | −1.12622 | 0.097 | −7.42255 | 1.9061 | 0.794 | −7.25389 | 3.42805 | 1.093 |
| −8.97098 | −0.81326 | 0.097 | −7.26363 | 2.26734 | 0.794 | −7.08055 | 3.78582 | 1.093 |
| −8.68369 | −0.47094 | 0.097 | −7.05341 | 2.67001 | 0.794 | −6.84175 | 4.17615 | 1.093 |
| −8.33795 | −0.10227 | 0.097 | −6.7899 | 3.11102 | 0.794 | −6.5346 | 4.59264 | 1.093 |
| −7.93244 | 0.28848 | 0.097 | −6.4707 | 3.58616 | 0.794 | −6.15901 | 5.03015 | 1.093 |
| −7.46587 | 0.6959 | 0.097 | −6.09147 | 4.08873 | 0.794 | −5.71482 | 5.48285 | 1.093 |
| −6.93743 | 1.11371 | 0.097 | −5.64556 | 4.60838 | 0.794 | −5.20008 | 5.942 | 1.093 |
| −6.34707 | 1.53509 | 0.097 | −5.12737 | 5.13279 | 0.794 | −4.6141 | 6.39827 | 1.093 |
| −5.69557 | 1.95277 | 0.097 | −4.533 | 5.64805 | 0.794 | −3.95891 | 6.84395 | 1.093 |
| −4.98431 | 2.35869 | 0.097 | −3.85841 | 6.13572 | 0.794 | −3.22539 | 7.2502 | 1.093 |

TABLE 1-continued

| X | Y | Z' | X | Y | Z' | X | Y | Z' |
|---|---|---|---|---|---|---|---|---|
| −4.21502 | 2.74316 | 0.097 | −3.1024 | 6.57458 | 0.794 | −2.40438 | 7.56859 | 1.093 |
| −3.38969 | 3.09396 | 0.097 | −2.26719 | 6.93972 | 0.794 | −1.50638 | 7.76029 | 1.093 |
| −2.51109 | 3.39557 | 0.097 | −1.36132 | 7.20606 | 0.794 | −0.55568 | 7.78933 | 1.093 |
| −1.58381 | 3.62884 | 0.097 | −0.3999 | 7.34834 | 0.794 | 0.41042 | 7.63073 | 1.093 |
| −0.61604 | 3.77179 | 0.097 | 0.59445 | 7.34414 | 0.794 | 1.3497 | 7.28275 | 1.093 |
| 0.37854 | 3.80293 | 0.097 | 1.59231 | 7.17899 | 0.794 | 2.23063 | 6.77085 | 1.093 |
| 1.3803 | 3.70632 | 0.097 | 2.56125 | 6.85098 | 0.794 | 3.03923 | 6.13208 | 1.093 |
| 2.36587 | 3.47564 | 0.097 | 3.47298 | 6.37423 | 0.794 | 3.77492 | 5.40206 | 1.093 |
| 3.31196 | 3.11518 | 0.097 | 4.31013 | 5.77574 | 0.794 | 4.44556 | 4.61158 | 1.093 |
| 4.20018 | 2.64056 | 0.097 | 5.06706 | 5.08661 | 0.794 | 5.06044 | 3.78381 | 1.093 |
| 5.01982 | 2.07435 | 0.097 | 5.747 | 4.33629 | 0.794 | 5.62653 | 2.9353 | 1.093 |
| 5.76786 | 1.44146 | 0.097 | 6.35804 | 3.54979 | 0.794 | 6.14895 | 2.07877 | 1.093 |
| 6.4464 | 0.76487 | 0.097 | 6.90829 | 2.74614 | 0.794 | 6.63428 | 1.22608 | 1.093 |
| 7.06135 | 0.06523 | 0.097 | 7.40443 | 1.93974 | 0.794 | 7.09551 | 0.39126 | 1.093 |
| 7.6201 | −0.64013 | 0.097 | 7.85411 | 1.14326 | 0.794 | 7.56314 | −0.40262 | 1.093 |
| 8.12709 | −1.33926 | 0.097 | 8.26398 | 0.36702 | 0.794 | 8.03373 | −1.15126 | 1.093 |
| 8.5873 | −2.02166 | 0.097 | 8.63834 | −0.38117 | 0.794 | 8.49158 | −1.85881 | 1.093 |
| 9.00608 | −2.67811 | 0.097 | 8.98052 | −1.09483 | 0.794 | 8.92608 | −2.52728 | 1.093 |
| 9.38647 | −3.30198 | 0.097 | 9.29421 | −1.76804 | 0.794 | 9.32528 | −3.16004 | 1.093 |
| 9.73013 | −3.8884 | 0.097 | 9.58158 | −2.39633 | 0.794 | 9.68114 | −3.75814 | 1.093 |
| 10.03972 | −4.43269 | 0.097 | 9.84326 | −2.97652 | 0.794 | 9.9902 | −4.31988 | 1.093 |
| 10.31676 | −4.93157 | 0.097 | 10.08047 | −3.50582 | 0.794 | 10.25201 | −4.84223 | 1.093 |
| 10.56231 | −5.38283 | 0.097 | 10.29392 | −3.98239 | 0.794 | 10.46936 | −5.32124 | 1.093 |
| 10.77748 | −5.78495 | 0.097 | 10.48404 | −4.40518 | 0.794 | 10.65412 | −5.75012 | 1.093 |
| 10.96341 | −6.13723 | 0.097 | 10.65083 | −4.77411 | 0.794 | 10.8106 | −6.12676 | 1.093 |
| 11.12128 | −6.43982 | 0.097 | 10.79417 | −5.09003 | 0.794 | 10.89321 | −6.46631 | 1.093 |
| 11.2524 | −6.69362 | 0.097 | 10.91355 | −5.35473 | 0.794 | 10.85138 | −6.75582 | 1.093 |
| 11.35838 | −6.90042 | 0.097 | 11.01361 | −5.56868 | 0.794 | 10.74202 | −6.96712 | 1.093 |
| 11.44007 | −7.06325 | 0.097 | 11.08235 | −5.74062 | 0.794 | 10.6193 | −7.1076 | 1.093 |
| 11.45863 | −7.19806 | 0.097 | 11.08675 | −5.87886 | 0.794 | 10.51115 | −7.19545 | 1.093 |
| 11.42363 | −7.28637 | 0.097 | 11.04535 | −5.9661 | 0.794 | 10.42886 | −7.24731 | 1.093 |
| 11.3843 | −7.33159 | 0.097 | 11.00183 | −6.00873 | 0.794 | 10.37453 | −7.27583 | 1.093 |
| 11.34681 | −7.35831 | 0.097 | 10.96199 | −6.03327 | 0.794 | 10.33162 | −7.29535 | 1.093 |
| 11.31171 | −7.37463 | 0.097 | 10.92239 | −6.04899 | 0.794 | 10.29209 | −7.3111 | 1.093 |
| 11.26276 | −7.3866 | 0.097 | 10.8679 | −6.05935 | 0.794 | 10.23965 | −7.32894 | 1.093 |
| 11.18297 | −7.38291 | 0.097 | 10.78062 | −6.04883 | 0.794 | 10.15465 | −7.35099 | 1.093 |
| 11.08125 | −7.33051 | 0.097 | 10.67577 | −5.97907 | 0.794 | 10.03016 | −7.36894 | 1.093 |
| 10.99022 | −7.20732 | 0.097 | 10.57839 | −5.84144 | 0.794 | 9.86178 | −7.36712 | 1.093 |
| 10.88248 | −7.04433 | 0.097 | 10.47665 | −5.65197 | 0.794 | 9.65222 | −7.32006 | 1.093 |
| 10.74926 | −6.84446 | 0.097 | 10.34997 | −5.41991 | 0.794 | 9.42195 | −7.19082 | 1.093 |
| 10.58889 | −6.60647 | 0.097 | 10.20423 | −5.13968 | 0.794 | 9.21713 | −6.95088 | 1.093 |
| 10.39989 | −6.32998 | 0.097 | 10.0352 | −4.81207 | 0.794 | 9.04591 | −6.62493 | 1.093 |
| 10.18083 | −6.01523 | 0.097 | 9.84237 | −4.43661 | 0.794 | 8.86248 | −6.24537 | 1.093 |
| 9.93019 | −5.66342 | 0.097 | 9.62655 | −4.01296 | 0.794 | 8.65746 | −5.81705 | 1.093 |
| 9.64634 | −5.27658 | 0.097 | 9.38865 | −3.54146 | 0.794 | 8.42876 | −5.34176 | 1.093 |
| 9.32775 | −4.85741 | 0.097 | 9.12873 | −3.02352 | 0.794 | 8.17968 | −4.81931 | 1.093 |
| 8.97255 | −4.40969 | 0.097 | 8.84596 | −2.46161 | 0.794 | 7.91402 | −4.24997 | 1.093 |
| 8.57825 | −3.93853 | 0.097 | 8.53939 | −1.85886 | 0.794 | 7.63433 | −3.63522 | 1.093 |
| 8.14241 | −3.44998 | 0.097 | 8.20839 | −1.21875 | 0.794 | 7.34113 | −2.97792 | 1.093 |
| 7.66222 | −2.95161 | 0.097 | 7.85074 | −0.54619 | 0.794 | 7.03409 | −2.28183 | 1.093 |
| 7.13496 | −2.45234 | 0.097 | 7.46292 | 0.15266 | 0.794 | 6.71158 | −1.55164 | 1.093 |
| 6.55817 | −1.96266 | 0.097 | 7.04108 | 0.87071 | 0.794 | 6.37158 | −0.79255 | 1.093 |
| 5.93041 | −1.49433 | 0.097 | 6.58059 | 1.59947 | 0.794 | 6.00989 | −0.01122 | 1.093 |
| 5.25138 | −1.06068 | 0.097 | 6.07483 | 2.32792 | 0.794 | 5.62105 | 0.78457 | 1.093 |
| 4.52319 | −0.67528 | 0.097 | 5.51641 | 3.04242 | 0.794 | 5.19877 | 1.5858 | 1.093 |
| 3.75126 | −0.35015 | 0.097 | 4.89816 | 3.72634 | 0.794 | 4.73614 | 2.38194 | 1.093 |
| 2.94406 | −0.09432 | 0.097 | 4.21472 | 4.36004 | 0.794 | 4.22487 | 3.15983 | 1.093 |
| 2.11195 | 0.08531 | 0.097 | 3.46249 | 4.91869 | 0.794 | 3.65547 | 3.90248 | 1.093 |
| 1.26671 | 0.18491 | 0.097 | 2.64426 | 5.37481 | 0.794 | 3.02072 | 4.58983 | 1.093 |
| 0.42072 | 0.20411 | 0.097 | 1.77371 | 5.70595 | 0.794 | 2.31755 | 5.19885 | 1.093 |
| −0.41402 | 0.14735 | 0.097 | 0.87323 | 5.89883 | 0.794 | 1.54785 | 5.70235 | 1.093 |
| −1.22725 | 0.02389 | 0.097 | −0.03051 | 5.953 | 0.794 | 0.7256 | 6.0786 | 1.093 |
| −2.01161 | −0.1526 | 0.097 | −0.91228 | 5.87847 | 0.794 | −0.12656 | 6.31296 | 1.093 |
| −2.76254 | −0.36744 | 0.097 | −1.75155 | 5.69216 | 0.794 | −0.98137 | 6.39389 | 1.093 |
| −3.47781 | −0.60611 | 0.097 | −2.5332 | 5.41315 | 0.794 | −1.79716 | 6.24689 | 1.093 |
| −4.15624 | −0.85638 | 0.097 | −3.247 | 5.06103 | 0.794 | −2.53422 | 5.94916 | 1.093 |
| −4.79729 | −1.10777 | 0.097 | −3.88705 | 4.65514 | 0.794 | −3.21637 | 5.62106 | 1.093 |
| −5.40058 | −1.35161 | 0.097 | −4.45148 | 4.21424 | 0.794 | −3.84232 | 5.27481 | 1.093 |
| −5.96502 | −1.58255 | 0.097 | −4.9426 | 3.75665 | 0.794 | −4.37867 | 4.87257 | 1.093 |
| −6.49015 | −1.79487 | 0.097 | −5.36587 | 3.29889 | 0.794 | −4.83301 | 4.44678 | 1.093 |
| −6.97507 | −1.98487 | 0.097 | −5.72796 | 2.85448 | 0.794 | −5.21337 | 4.01884 | 1.093 |
| −7.41903 | −2.1495 | 0.097 | −6.035 | 2.43335 | 0.794 | −5.5309 | 3.60639 | 1.093 |
| −7.82146 | −2.28606 | 0.097 | −6.29489 | 2.04444 | 0.794 | −5.79752 | 3.22277 | 1.093 |
| −8.18198 | −2.39201 | 0.097 | −6.51784 | 1.69608 | 0.794 | −6.02712 | 2.87938 | 1.093 |
| −8.50013 | −2.4652 | 0.097 | −6.71156 | 1.39345 | 0.794 | −6.23018 | 2.58347 | 1.093 |
| −8.7752 | −2.50304 | 0.097 | −6.88199 | 1.13976 | 0.794 | −6.42881 | 2.3517 | 1.093 |
| −9.00524 | −2.50418 | 0.097 | −7.02918 | 0.93374 | 0.794 | −6.62976 | 2.19818 | 1.093 |
| −9.18653 | −2.47116 | 0.097 | −7.16264 | 0.781 | 0.794 | −6.82293 | 2.13717 | 1.093 |

TABLE 1-continued

| X | Y | Z' | X | Y | Z' | X | Y | Z' |
|---|---|---|---|---|---|---|---|---|
| −9.31587 | −2.41478 | 0.097 | −7.29116 | 0.69382 | 0.794 | −6.97789 | 2.14399 | 1.093 |
| −9.39665 | −2.3537 | 0.097 | −7.40027 | 0.671 | 0.794 | −7.08347 | 2.17932 | 1.093 |
| −9.44151 | −2.30582 | 0.097 | −7.47077 | 0.68663 | 0.794 | −7.14633 | 2.21467 | 1.093 |
| −9.46877 | −2.26983 | 0.097 | −7.51393 | 0.71128 | 0.794 | −7.18628 | 2.24412 | 1.093 |

In the above table, the plane Z'=0 corresponds to the reference plane P0 situated at the base of the profile. This plane P0 is the intersection of the stacking axis AE of the set of blades with the axisymmetric surface of the hub, i.e. it passes via the intersection between the axis AE and the surface 12A where it is assembled with the platform 12. The plane Z'=1 corresponds to the reference plane P1 situated at the top of the profile. This plane P1 is the intersection between the axis AE and the axisymmetric surface of the casing, i.e. it passes via the intersection of the axis AE with the surface 16A where it is assembled with the top platform 16.

By convention, the stacking axis AE of the set of blades, for the blade of a rotary wheel, is the axis that extends in the radial direction Z and passes through the barycenter of the profile of the blade in section in the X, Y planes. This is the axis on which the various X,Y sections of the set of blades are "stacked" when designing the set of blades.

As mentioned at the beginning of the present description, the aerodynamic profile of the invention is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile.

The coordinates of the above table are given starting from a value Z'=0 in the reference plane P0. The coordinate Z' is non-dimensional, i.e. for a point P, situated at a distance D from the plane P0 (where D is measured along the axis Z), the value of Z' is D/H, where H represents the total height of the profile as measured between the planes P0 and P1. Naturally, in the table above, by multiplying the coordinate Z' by the height H, it is possible to obtain the complete coordinates of the blade.

In the above table, the profile is characterized by fifteen sections at constant Z' coordinates, for which the coordinates X and Y are specified. In each section plane at constant coordinate Z', the section of the profile is given by a continuous and smooth curve, interconnecting all of the points (X,Y). In each section plane, the profile is interpolated so as to generate a uniform profile.

Preferably, the height H of the profile of the blade lies in the range 70 centimeters (cm) to 110 cm, e.g. being about 90 cm. The reference plane P0 is at a distance lying in the range 270 cm to 360 cm, e.g. about 315 cm, from the axis A of the turbine.

Figure 3:
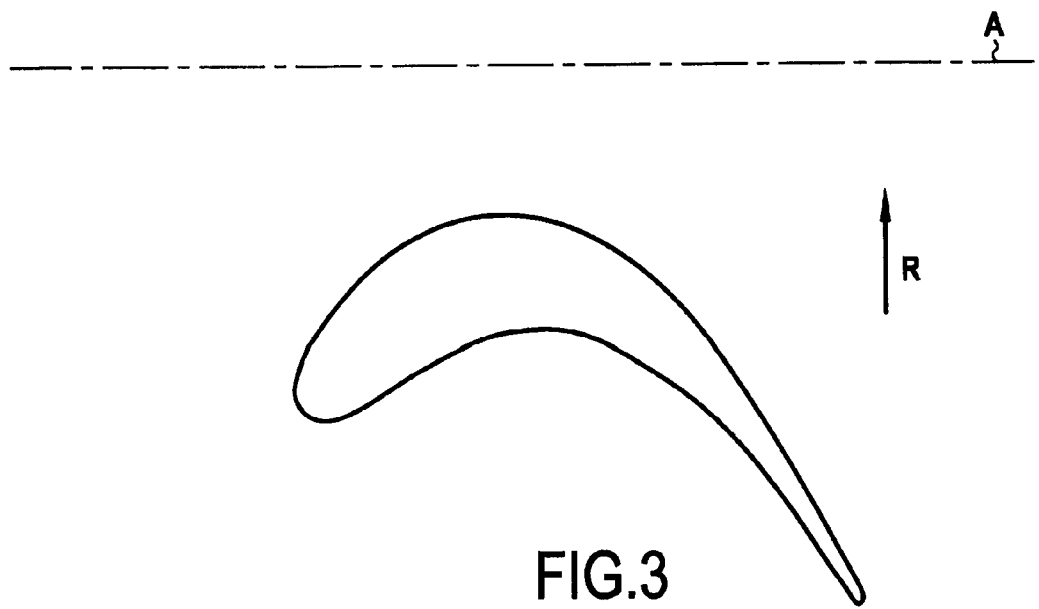
FIG. 3 is a diagrammatic section view of the FIG. 2 blade on an X-Y plane.

FIG. 3 is a diagram of a section of the profile 14 in a plane X,Y parallel to the plane P0. As stated above, the blade R1 is in particular a blade of the rotary wheel of the first stage of a turbine. This blade is therefore rotary, and it rotates in the direction of arrow R.

It is advantageous for the rotary wheel that includes the blade of the invention to have 153 to 173 blades that present aerodynamic profiles as defined above.

The invention claimed is:

1. An aerodynamic profile for a turbine blade, the profile being, when cold and in a non-coated state, substantially identical to a nominal profile determined by Cartesian coordinates X,Y,Z' given in Table 1, in which the coordinate Z' is a quotient D/H, where D is a distance of a point under consideration from a first reference X,Y plane situated at a base of the nominal profile, and H is a height of said profile measured from said first reference plane that is an intersection of a stacking axis of a set of blades and an axisymmetric surface of a hub, out to a second reference plane that is an intersection of said stacking axis with an axisymmetric surface of a casing, the measurements D and H being taken radially relative to an axis of a turbine, and the coordinate X is measured in an axial direction of the turbine.

2. The aerodynamic profile as claimed in claim 1, wherein said profile is defined within an envelope of ±1 mm in a direction normal to the surface of the nominal profile.

3. The aerodynamic profile as claimed in claim 1, wherein the coordinates X,Y of said profile lie within a range of ±5% relative to the coordinates X,Y of the nominal profile.

4. The aerodynamic profile as claimed in claim 1, wherein the blade is a blade of a rotary wheel forming a portion of a rotor of a turbine.

5. The aerodynamic profile as claimed in claim 4, wherein the blade is a blade of the rotary wheel of the first stage of the turbine.

6. The aerodynamic profile as claimed in claim 4, wherein the blade is a blade of the rotary wheel of the first stage of a turbine having four stages.

7. A turbine, including turbine blades presenting aerodynamic profiles as claimed in claim 1.

8. A turbine as claimed in claim 7, including a rotary wheel, having 153 to 173 blades.

9. A rotary wheel of a turbine forming a portion of a turbine rotor, wherein all the blades of this rotary wheel present an aerodynamic profile as claimed in claim 1.

10. A rotary wheel of a turbine as claimed in claim 9, including 153 to 173 blades.

\* \* \* \* \*